United States Patent [19]
Pommerening et al.

[11] 3,952,165
[45] Apr. 20, 1976

[54] TIE TRUNK CONTROL ARRANGEMENT
[75] Inventors: Uwe A. Pommerening; Glenn L. Richards, both of Webster, N.Y.
[73] Assignee: Stromberg-Carlson Corporation, Rochester, N.Y.
[22] Filed: Mar. 25, 1975
[21] Appl. No.: 561,954

[52] U.S. Cl. .......................................... 179/27 CA
[51] Int. Cl.² .......................................... H04Q 3/62
[58] Field of Search ........ 179/18 AH, 27 FF, 27 CA

[56] References Cited
UNITED STATES PATENTS
3,384,717  5/1968  Coston ........................... 179/27 CA Primary Examiner—William C. Cooper
Attorney, Agent, or Firm—William F. Porter, Jr.; William A. Marvin

[57] ABSTRACT

A tie trunk control arrangement is disclosed for providing tie trunk connections in an electronic private automatic branch exchange which is built around a space divided solid state matrix. Each tie trunk has an associated tie trunk junctor dedicated thereto which may be connected to local stations by the PABX system in a manner similar to other trunk junctors. For incoming tie trunk connections an attendant extension or station attendant extension is used for providing connections to other PABX stations and trunk circuits. Common circuitry used for trunk transfer and trunk consultation may be used by the station attendant to extend the tie trunks to the PABX stations and the outgoing trunk junctors. Further circuitry is provided by the tie trunk control arrangement to allow a tie trunk and a central office trunk to be tandemed in the system or to allow two tie trunks to remain tandemed in the system without attendant supervision.

6 Claims, 17 Drawing Figures

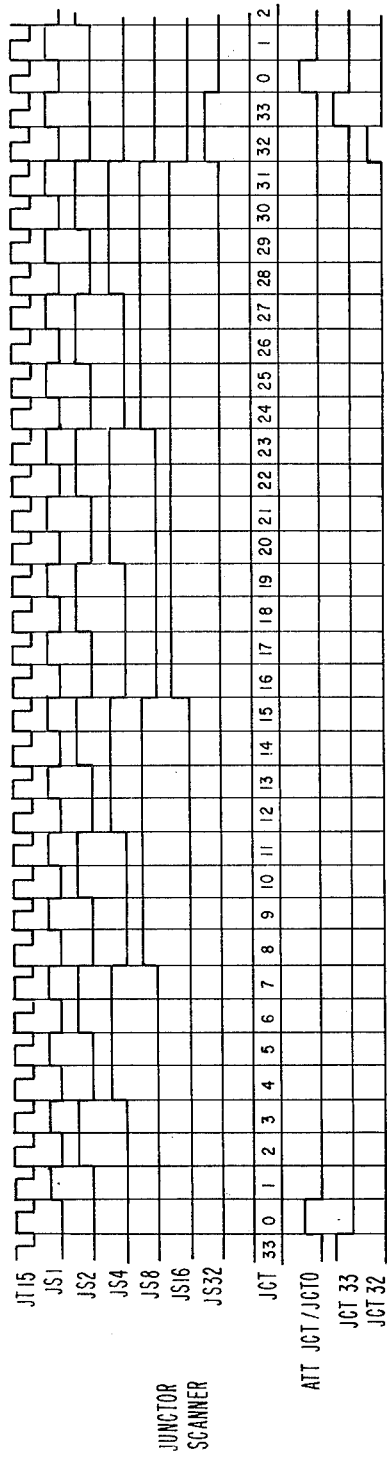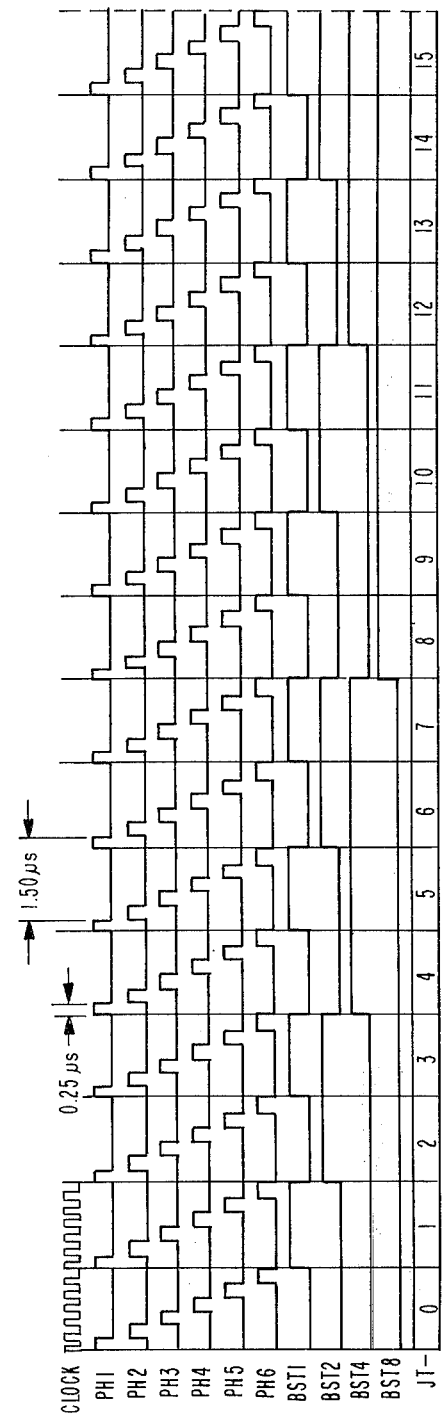

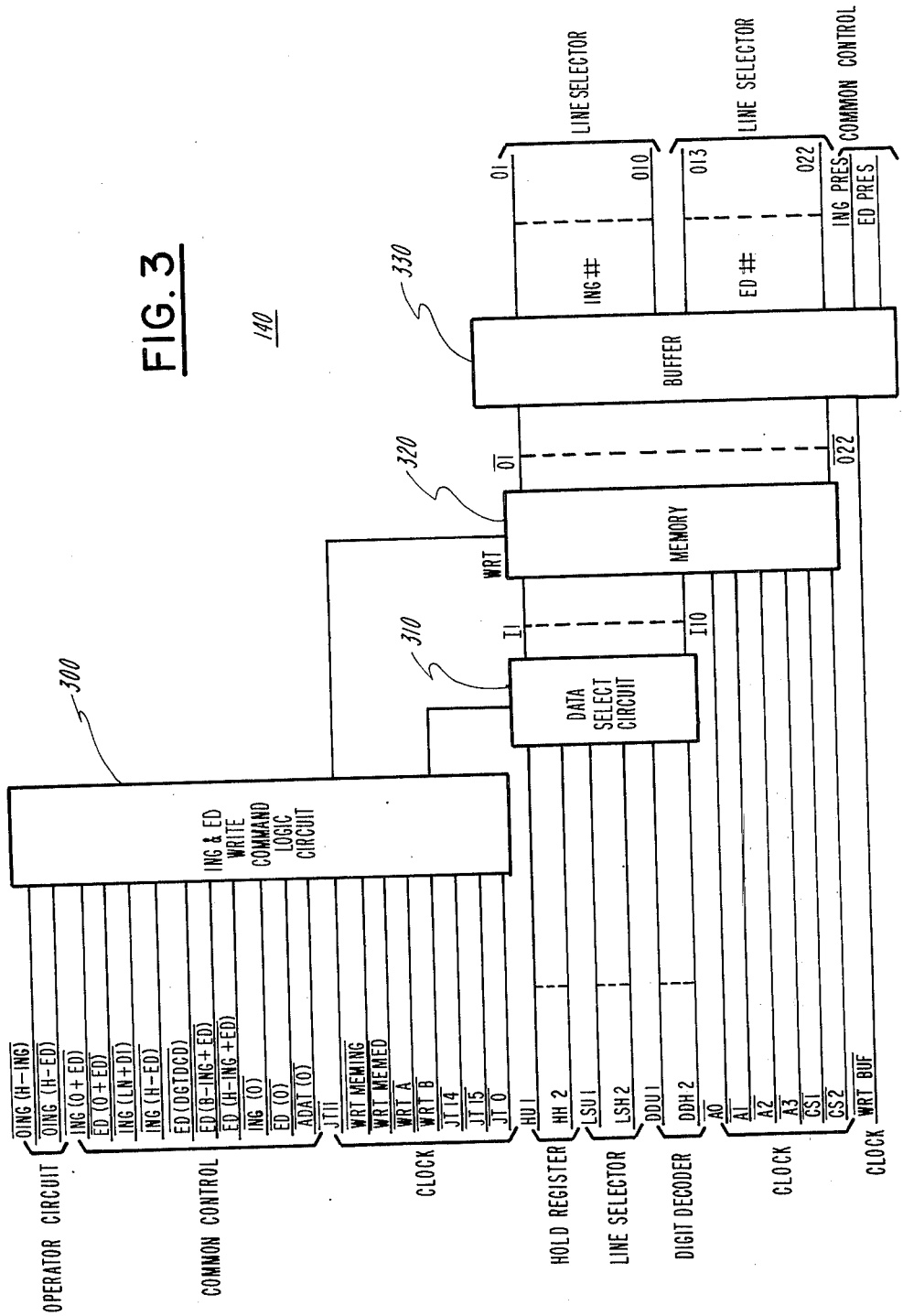

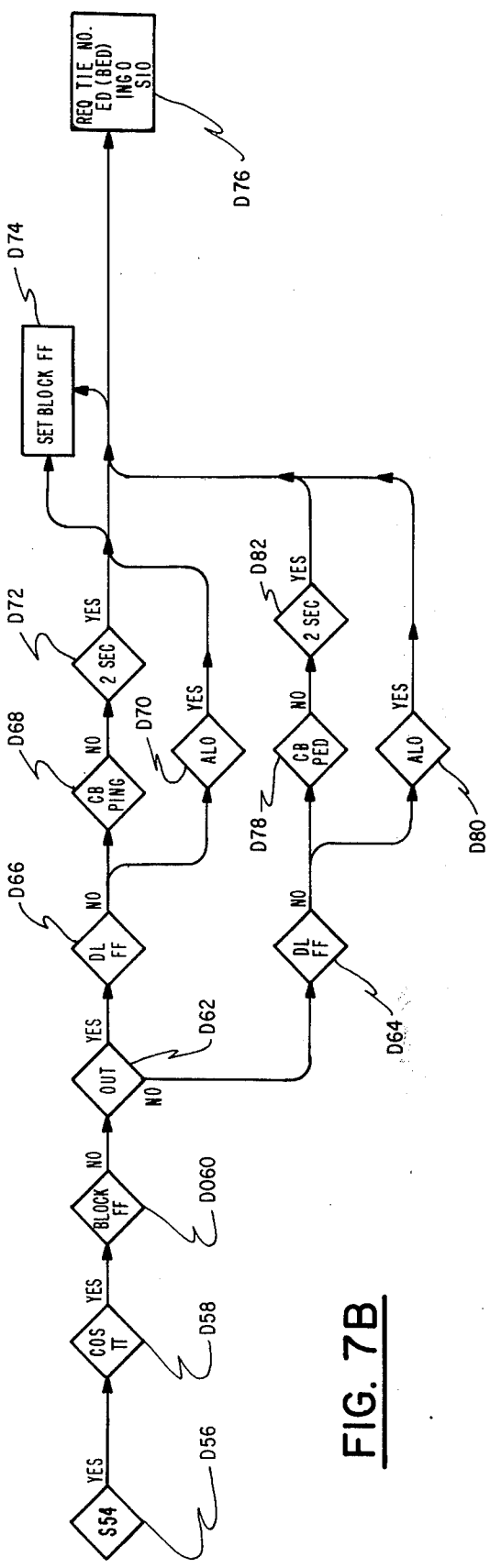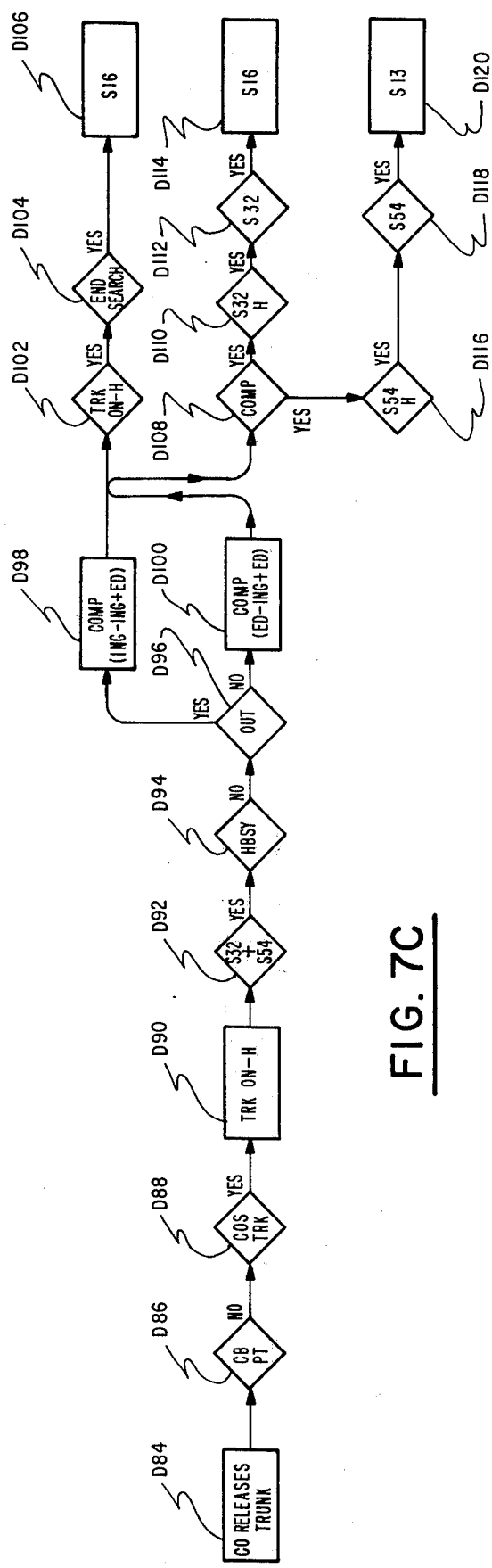
FIG. 7B
FIG. 7C

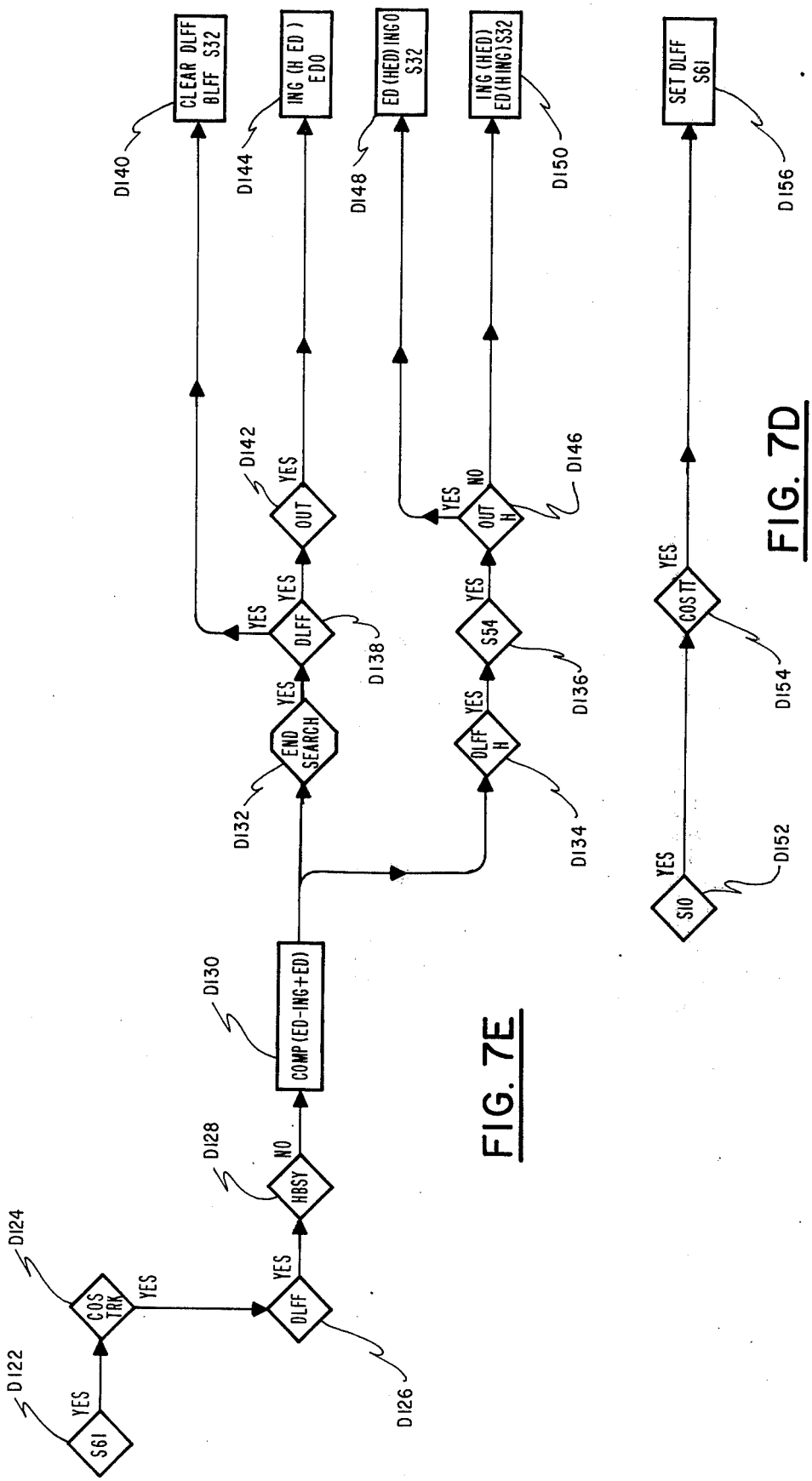

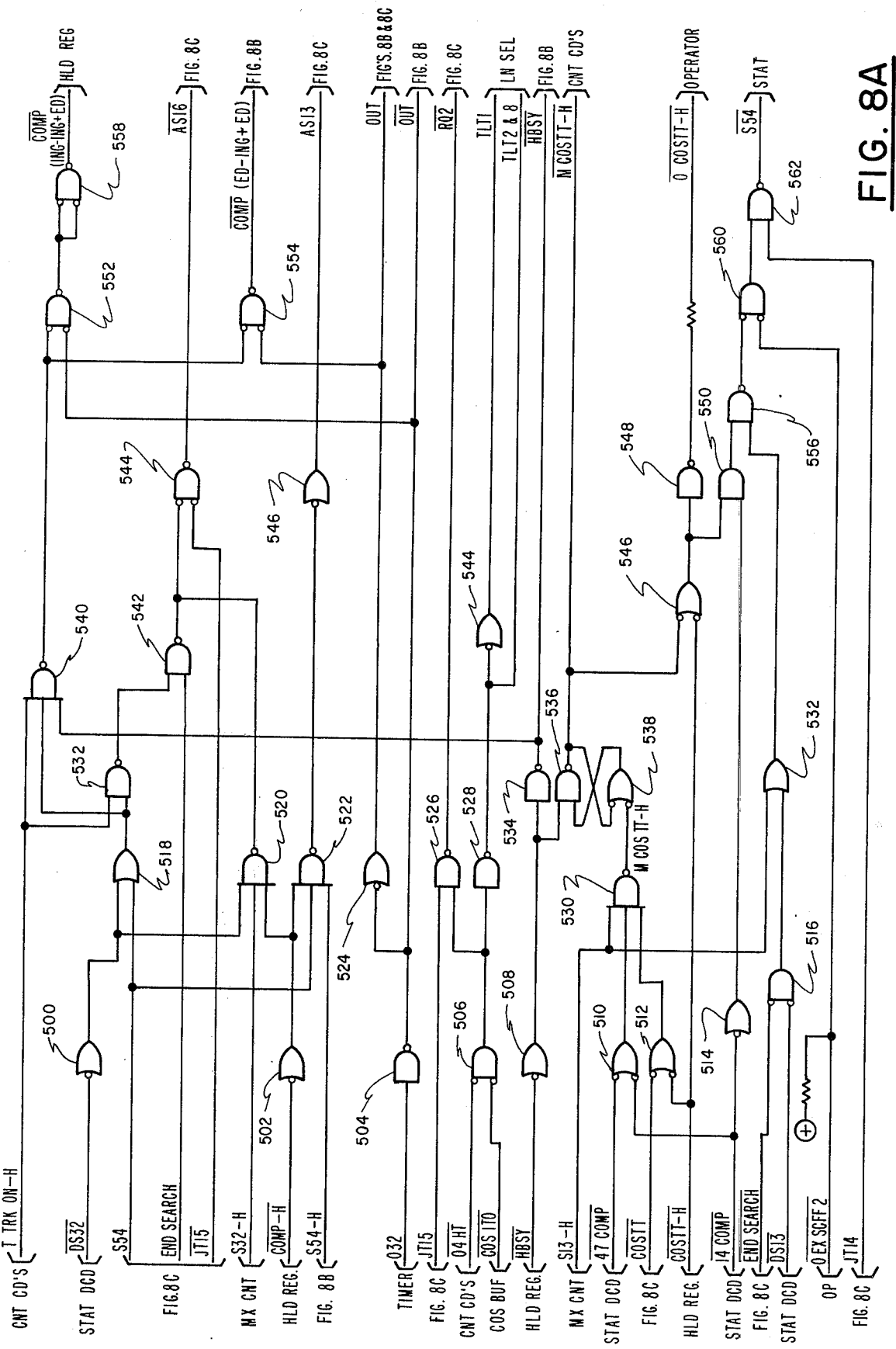

TIE TRUNK CONTROL ARRANGEMENT

BACKGROUND OF THE INVENTION

The present invention relates generally to system arrangements for an electronic private automatic branch exchange, and more particularly to a tie trunk control arrangement for an electronic private automatic branch exchange which is built around a space divided solid state matrix.

Tie trunks are generally known in the art to connect one private automatic branch exchange to another private automatic branch exchange while a central office (CO) trunk is used for the connection of a private automatic branch exchange to a central office. It is often necessary to provide additional circuitry in a private automatic branch exchange for differentiating the control functions of the system between central office (CO) trunks and tie trunks because of their diverse purposes. Advantageously, the additional circuitry and any operational differences between tie trunks and CO trunks of a system should be minimized. Tandem operation of a tie trunk and a CO trunk or two tie trunks through a tying PABX should be provided in such a system to allow a local station of a tied PABX to access a connected central office or another tied PABX. Also, it would be useful to provide attendant control of a tandem operation to obviate toll restriction requirements.

Recently, an electronic private automatic branch exchange which is build around a space divided rectangular solid state switching matrix was developed to provide an exchange which is more dependable in operation and less subject to misoperation due to interference, cross-talk and other problems.

In this exchange one side of the solid state matrix provides line appearances which are connected to line circuits, tone receivers, sender and operator loops. The other coordinate side of the matrix provides junctor appearances for connections to an attendant junctor, local junctor, tie trunk junctors, and trunk junctors. The solid state switching matrix is a single stage matrix providing direct connection between line appearances and junctor appearances by closing of a single crosspoint. The connection between lines within the system is effected simply by the interconnection of a pair of crosspoints associated with the respective lines in a selected junctor, thereby providing a greatly decreased amount of switching for establishing a connection through the matrix.

The electronic private automatic branch exchange providing the above features is more fully described in co-pending application, entitled, "Electronic Private Automatic Branch Exchange," Ser. No. 431,928, filed on Jan. 9, 1974, in the names of Uwe A. Pommerening and Glenn L. Richards, and assigned to the same assignee as the present application and the disclosure which is incorporated herein by reference.

A novel and advantageous trunk transfer circuit for the above electronic private automatic branch exchange is more fully described in a co-pending application, entitled, "Trunk Transfer Circuit," Ser. No. 561,744, filed on Mar. 25, 1975, in the name of Uwe A. Pommerening, assigned to the same assignee as the present application, the disclosure of which is herein incorporated by reference.

Further, a novel and useful trunk consultation arrangement incorporating the trunk transfer circuit is more fully described in a co-pending application, entitled, "Trunk Consultation Arrangement," Ser. No. 561,825, filed on Mar. 25, 1975, in the name of Uwe A. Pommerening, assigned to the same assignee as the present application, the disclosure which is herein incorporated by reference.

SUMMARY OF THE INVENTION

The present invention provides a control arrangement for tie trunk connections in an electronic private automatic branch exchange which is built around a space divided solid state matrix. Each tie trunk is associated with a tie trunk junctor assigned a tie trunk class-of-service and a portion of the junctor memory of the exchange. Connections of tie trunks with PABX stations or the attendant are, therefore, performed in a manner similar to normal trunk-local station connections. The arrangement includes first extending means, under the supervision of a station attendant and incorporating the common trunk transfer and trunk consultation circuitry, for extending tie trunks to PABX stations or outgoing trunk junctors. Further, second extending means under the supervision of a turret attendant, are provided for extending tie trunks to PABX stations and outgoing trunk junctors. Additional circuitry responsive to the first and second extending means is provided by the tie trunk control arrangement to permit a tie trunk and a central office trunk to be tandemed in the system or to permit two tie trunks to remain tandemed in the system without attendant supervision.

Accordingly, it is an object of the invention to provide an arrangement to substantially eliminate differences in circuitry between trunks and tie trunks.

It is another object of the invention to provide a tie trunk control as a time shared commonly accessible circuit in the common control.

It is still another object of the invention to provide for attendant extension of tie trunks to PABX stations or outgoing trunks where the attendant is either a station attendant or a turret attendant.

It is a further object of the invention to provide tandem operation between two tie trunks or a tie trunk and a central office trunk.

These and other features, objects, and advantages of the present invention will become clearer and more evident from the following detailed description of a preferred embodiment viewed in conjunction with the accompanying drawings, wherein:

BRIEF DESCRIPTION OF THE DRAWINGS

FIGS. 2A, 2B and 2C are waveform diagrams of clock signals used to control the timing functions within the system;

FIG. 3 is a schematic block diagram of a junctor memory associated with the present invention;

FIGS. 7A–E are flow diagrams illustrating the decisional sequences performed during the status progression of FIG. 6; and FIGS. 8A–C are detailed electrical schematic wiring diagrams of circuitry arranged to implement the decisional sequences shown in FIG. 7.

DETAILED DESCRIPTION OF THE PREFERRED EMBODIMENT

Figure 1A:
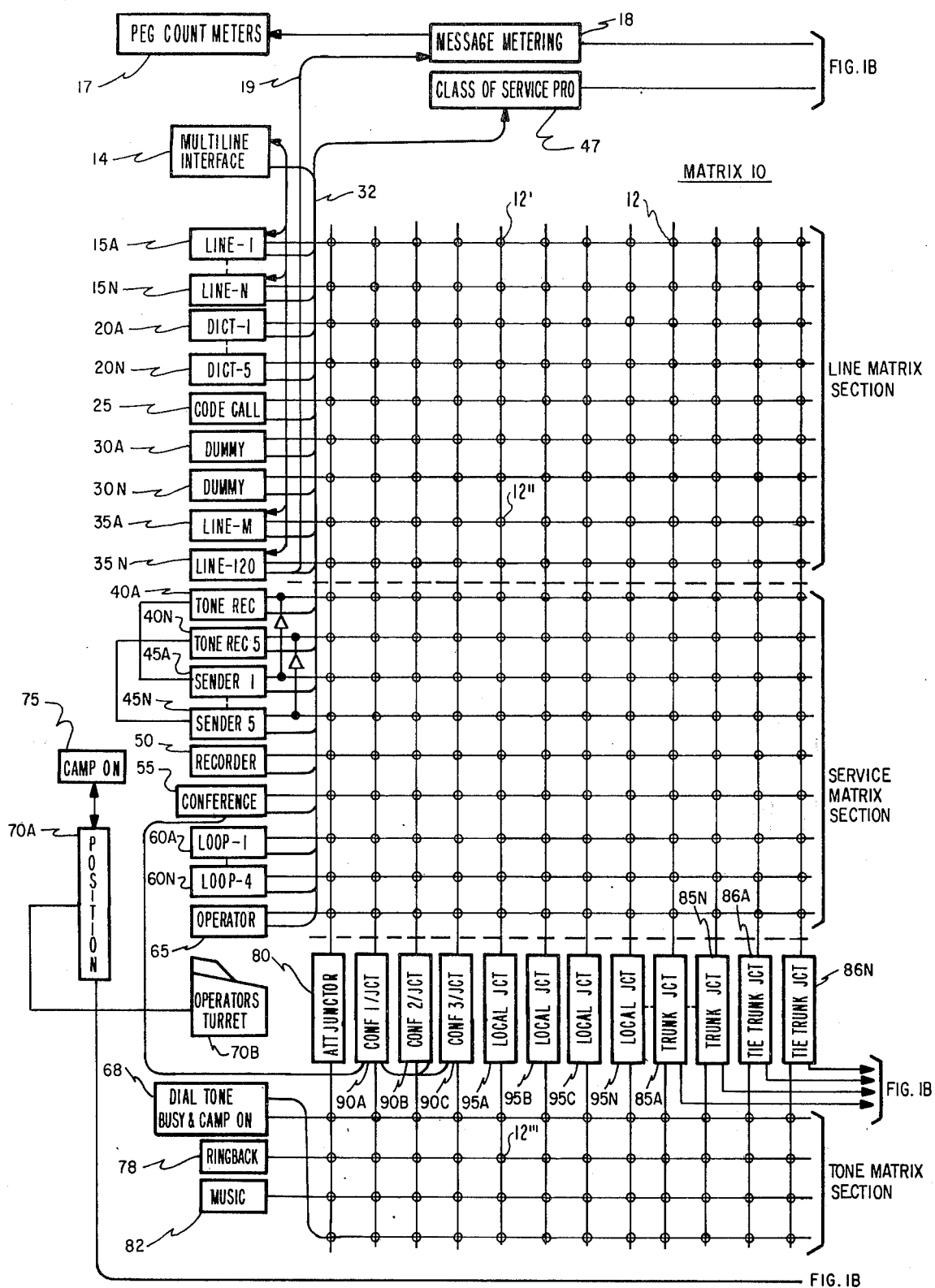
FIGS. 1A and 1B, in combination, form a schematic block diagram of the electronic private automatic branch exchange incorporating the present invention.

The present invention will now be described in conjunction with an electronic private automatic branch exchange which is built around a space divided solid state matrix. The exchange is shown in system block diagrams in FIGS. 1A and 1B and includes a solid state switching matrix 10.

The matrix 10 is a single stage rectangular array of cross-points divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Line appearances are provided on the left side of the line matrix section, as seen in FIG. 1, including a plurality of line circuits 15A through 15N and 35A through 35N. Between the line circuits there are provided connections to special lines which take the place of regular lines in the system. These special lines are dictation access circuits 20A through 20N, a code call circuit 25 and a plurality of dummy line tie trunks 30A through 30N.

Line appearances at the service matrix section take the form of a plurality of tone receivers 40A through 40N, a plurality of register senders 45A through 45N, an intercept recorder 50, a conference bridge 55, a plurality of operator loop circuits 60A through 60N and an operator line circuit 65. The number of tone receivers, register senders and operator loop circuits, like the number of line circuits connected to the line appearance inputs of the matrix 10 depend upon the traffic requirements and size of the system. It will be obvious from the following description that an increase or decrease in the number of these circuits is easily accomplished by merely changing the overall size of the matrix 10.

The outputs of the matrix 10 are provided in the form of a plurality of junctor appearances, as seen in FIG. 1. The junctor appearances are associated with an attendant junctor 80, a plurality of conference junctors 90A through 90C, a plurality of local junctors 95A through 95N, a plurality of trunk junctors 85A through 85N and a plurality of tie trunk junctors 86A through 86N. The trunk junctors 85A through 85N are connected to corresponding trunks 89A through 89N, and the tie trunk junctors 86A through 86N are associated with corresponding tie trunks 87A through 87N.

The tone matrix section of the matrix 10 provides inputs on respective lines from a combined dial tone generator and busy-camp on tone generator 68, along with inputs from a ring-back tone generator 78 and music source 82. The outputs of the tone matrix section are connected through the respective junctors to the junctor appearances of the line and service matrix sections of the matrix 10.

The operator complex includes, in addition to the loop circuits 60A through 60N and the operator line circuit 65, an operator position circuit 70A to which is connected an operator turret 70B.

A camp-on circuit 75 providing a special feature in the system is also connected to the operator position circuit 70A. As another special feature of the system, a message metering circuit 18 and one or more peg count meters 17 are associated with the line circuits via a bus 19.

The matrix 10 functions to selectively connect an input from a line to a selected junctor by closing the appropriate crosspoint and to provide an appropriate tone through the selected junctor to the line by closing the appropriate crosspoint in the tone matrix section. Connection from one line to another line is also effected by closing the pair of crosspoints in the line matrix section associated with the respective lines and a common junctor.

The matrix 10 is designed to carry only the audio communication between lines or between a line and a trunk. The signaling associated with the establishment of the communication connection through the matrix 10 is handled outside of the matrix via a common bus 32 through a class-of-service programmer 47 connected to the common control equipment 100.

Figure 1B:
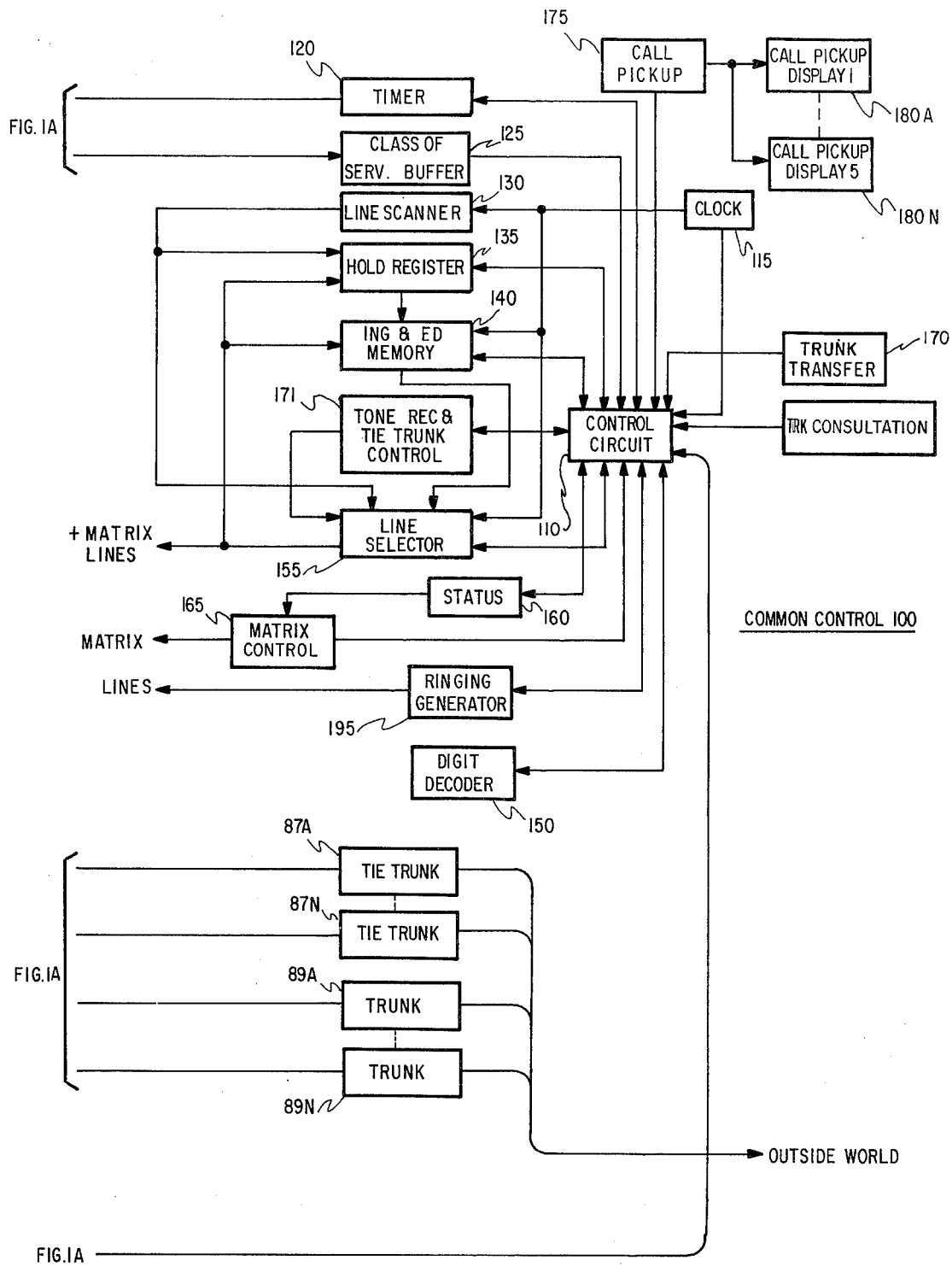

FIG. 1B schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook and off-hook timing, time-outs, flash detection and other conventional timing functions are performed by the timer 120. In this regard, the timer 120 operates with the control circuits 110 to perform whatever timing functions are necessary within the system.

A class-of-service buffer 125 forms an interface between the class-of-service programmer 47 and the logic circuitry of the common control 100. Thus, the various line conditions which are derived through the class-of-service programmer 47 each time a line is addressed will be passed to the control circuits 110 through the class-of-service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class-of-service programmer 47 to the control circuit 110 in the common control 100 via the class-of-service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of a communication connection between parties and in providing various functions requested by the parties during the call, it is necessary at various times to temporarily store information as functions are being performed within the system by the common control 100. The hold register 135 provides the temporary storage capability in the system.

The system includes an ING and ED memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of these lines which are stored therein. In this way, the identity of the crosspoints in the matrix 10 associated with the line or lines involved with the junctor can be identified.

A line selector 155 receives line designations from the line scanner 130 and from the junctor memory 140, and in response to the clock signals from the clock 115 selectively addressed cross-points in the matrix 10 and selected lines at the proper times. As already indicated in connection with the description of the solid state crosspoint matrix 10, addressing alone of the crosspoint will open the crosspoint, while addressing in combination with a positive request for actuation of the crosspoint will close the crosspoint. Whether or not the crosspoint is to be opened or closed is determined by the status of the call based upon the progress of the connection as determined by the control circuits 110 from the information derived from the lines via the class-of-service programmer 47 and class-of-service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the crosspoint, i.e., whether it is to be open or closed, is derived from the status circuit 160. If the crosspoint which is addressed from the line selector 155 is to be closed for a particular call, a matrix control 165 will receive information from the status circuit 160 to this effect and generate a positive request signal for closing of the crosspoints. If the crosspoints are not to be closed, the matrix control 165 will produce no output as the crosspoints are addressed, thereby effecting an automatic opening of the crosspoints.

A ringing generator 195 of any known form is provided for application of ringing current to the lines under control of the control circuits 110. While the ringing generator is in itself a conventional circuit, the application of ringing to the line in the system of the present invention is somewhat different than know systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system in reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system provides a local transfer circuit 170 which effects transfer between stations, as may be required.

A further special feature of the present invention is embodied in a call pickup arrangement including a call pickup circuit 175 and a plurality of call pickup displays 180A through 180N. In accordance with this special feature, a party may respond to a call to another party identified on the call pickup display.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class-of-service programmer 47 along with the class-of-service information concerning that line circuit to the common control 100.

Assuming that the line circuit 15A has gone off-hook and is requesting service, this line will ultimately be adddressed by the line selector 155 when the line scanner 130 reaches this line in its scan of all of the lines. At the same time, the line selector 155 will also address all of the crosspoints of the matrix 100 associated with the line circuit. In this case, all of the crosspoints associated with the line circuit 15A along the first horizontal of the matrix including the crosspoint 12' will be addressed. If, as a result of some misoperation, one or more of these crosspoints has been inadvertently closed, the addressing of the crosspoints at this time will automatically open the crosspoints in the absence of the positive control from the matrix control 165 indicating that one or more of these crosspoints should be closed. Since the line 15A has just requested service, none of the crosspoints should be closed and therefore the status circuit 160 will provide no indication to the matrix control 165 that any of the crosspoints involved should be closed. In view of the fast scanning times provided within the system for scanning the lines and junctors, it can be seen that a misoperation of a crosspoint will be immediately corrected so that no effect upon any communication connection through the matrix will result, nor will such crosspoint misoperation be noticeable to either party except for a click as the crosspoint is opened or closed to correct the state thereof. Further details concerning the unique operation of the matrix under control of the line scanner 130, line selector 155 and matrix control 165 are disclosed in our copending application Ser. No. 431,878, filed on Jan. 9, 1974, and assigned to the same assignee as the present application.

When the control circuit 110 receives an indication through the class-of-service buffer 125 that the line circuit 15A has requested service, the control circuits 110, which include a junctor allotter and is more fully described in copending application Ser. No. 448,288, filed on May 5, 1974, and assigned to the same assignee as the present invention, will assign a free junctor to the line circuit and request that the calling line number of the line circuit 15A be stored in the junctor memory 140 in the time position assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95A, the calling line number of the line circuit 15A will be stored in the memory position of the junctor memory 140 permanently assigned to the local junctor 95A, and each time the junctors are scanned, the line number of the calling line 15A will be forwarded to the line selector 155 so that the line 15A can be addressed at this time and the crosspoint associated both with the line 15A and the junctor 95N, i.e., the crosspoint 12' can be addressed. The status circuit 160 indicates to the matrix control 165 that the call is in a state wherein the crosspoint 12' should be closed, and therefore the matrix control 165 will forward a positive request for closing the crosspoint 12' at the time the crosspoint is addressed. As a result, the line circuit 15A will be connected through the matrix 10 to the local junctor 95N.

At the same time that the crosspoint 12' is addressed and closed to enable connection between the line circuit 15A and the local junctor 95A, the matrix control 165 under control of the status circuit 160 addresses the crosspoints of the tone matrix section of the matrix 10 associated with the dial tone generator 68 so that the crosspoint 12''' will be closed connecting the dial tone generator 68 through the local junctor 95A to the line circuit 15A. The line circuit may then commence to dial the number of the party to which it desires connection.

The control circuits 110 in the common control 100 will advance the status circuit 160 of the particular junctor 95A to state 2 if the calling line circuit has rotary dial equipment or to state 3 if the calling line circuit has TONE-DIAL (multifrequency dialing) equipment, as determined from the class-of-service information for that line circuit received from the class-of-service programmer 47. Each time the junctor 95A is scanned, the number of the calling line circuit 15A will be provided by the junctor memory 140 to the line selector 155 which will address the line permitting the calling bridge relay state to be monitored via the bus 32 and class-of-service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95A both the calling and called line numbers.

When it is determined by the timer 120, more fully described in copending application Ser. No. 542,947, filed on Jan. 22, 1975, entitled, "Timer Apparatus" and assigned to the same assignee as the present application, that the calling line 15A has completed dialing, the control circuits 110 will advance the status circuit 160 to record state 4 in the position of the memory thereof assigned to the junctor 95A. State 4 relates to busy test, and more fully described in copending application Ser. No. 543,042, filed on Jan. 22, 1975, entitled, "Busy Test Arrangement for EPABX" and assigned to the same assignee as the present application, of the busy called line circuit. If the called line circuit is found to be busy, the tone matrix section of the matrix 10 is once again addressed from the matrix control 165 to connect busy tone from the generator 68 through the local junctor 95A to the calling line circuit 15A. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95A to the calling line circuit 15A. The control over the tone matrix section of the matrix 10 to provide for connection of dial tone, busy tone, ring back tone and music to the lines through selected junctors is described in greater detail in our copending application Ser. No. 431,885, filed on Jan. 9, 1974, and assigned to the same assignee as the present application.

The matrix control 165, upon receiving the calling and called line numbers from the junctor memory 140 as the junctor 95A is scanned, will address the crosspoint 12' and also the crosspoint associated with the called line, for example, crosspoint 12'' associated with the line 35A. Thus, when the called party answers in response to the applied ringing, he will be connected via crosspoints 12' and 12'' in the matrix 10 to the calling party, and the respective line circuits 35A and 15A will receive ground to maintain crosspoint bias, as described in connection with FIG. 3, from the local junctor 95A during the duration of the call. At this time, the status circuit 160 is advanced by the control circuits 110 to status 7, indicating to the system that a local call is in progress.

Where the lines are equipped with TONE-DIAL (multi-frequency) equipment, this class-of-service for the line circuit is indicated to the common control by the class-of-service programmer 47. In this regard, the class-of-service programmer 47 typically includes a panel having selected class-of-service plugs so that the features of the system may be allocated on a real time line basis and the information with respect thereto may be provided to the common control 100. Thus, in addition to providing a path for the calling bridge relay information from the lines, the class-of-service programmer 47 also submits at this time class-of-service data concerning the particular line for use by the common control 100.

When a call is in state 3 indicating dialing from TONE-DIAL (multi-frequency) equipment, the common control 100 effects connection via the matrix between the calling line and an available one of the tone receivers 40A through 40N. The tone receiver converts the TONE-DIAL signal into the corresponding binary number, which is received by the common control 100 and placed into the ING or ED memory 140.

Since the operator loop circuits 60A through 60N are merely provided as line appearances at the input of the matrix 10, the functions associated with the operator positions are greatly simplified. Because of the fast switching capability of the crosspoints in the matrix 10, the split functions normally associated with incoming connections to the operator may be performed with the matrix crosspoints. Thus, special trunk circuits having separate operator access with split tip and ring pairs, as normally required in conventional systems, are not required in the system of the present invention.

In addition, since the split functions are performed in the present system within the matrix 10 by selective operation of the crosspoints, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the attendant junctor 80 controls the crosspoints for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex are not required. The junctor circuit once again takes care of the duties normally provided in this regard. In addition, due to the elimination of information trunk hardware, tandem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor 90A–90C upon detection of the request for service in the manner described above by closing the crosspoint in the matrix 10 common to the line circuit and a selected available local junctor. In the foregoing example, by closing local junctor 95A. An addressing of the tone matrix section provides connection of the dial tone generator 68 through crosspoint 12''' and the local junctor 95A to the line circuit 15A. When dialing commences, the crosspoint 12''' is released, disconnecting dial tone from the line circuit and the dialing impulses are received in the common control 100 via the class-of-service programmer 47. The digit decoder 150 for outgoing trunk calls will recognize the first digit as a request for access to a trunk circuit and the control circuits 110 will indicate the need to connect to a trunk junctor. The junctor allotter, more fully described in copending application Ser. No. 448,288, filed May 5, 1974, entitled, "Junctor Allotter" and assigned to the same assignee as the present application, in the control circuits 110 will select an available trunk junctor, for example, the junctor 85A connected to the trunk 89N.

As can be seen, with the arrangement of the present invention, many different functions can be performed during the time in which a junctor is being scanned through selective control of various crosspoints within the matrix 10 under control of the common control 100 during designated time slots of the junctor scan period, as will be described in greater detail in connection with the system timing.

SYSTEM TIMING

Figure 2B:
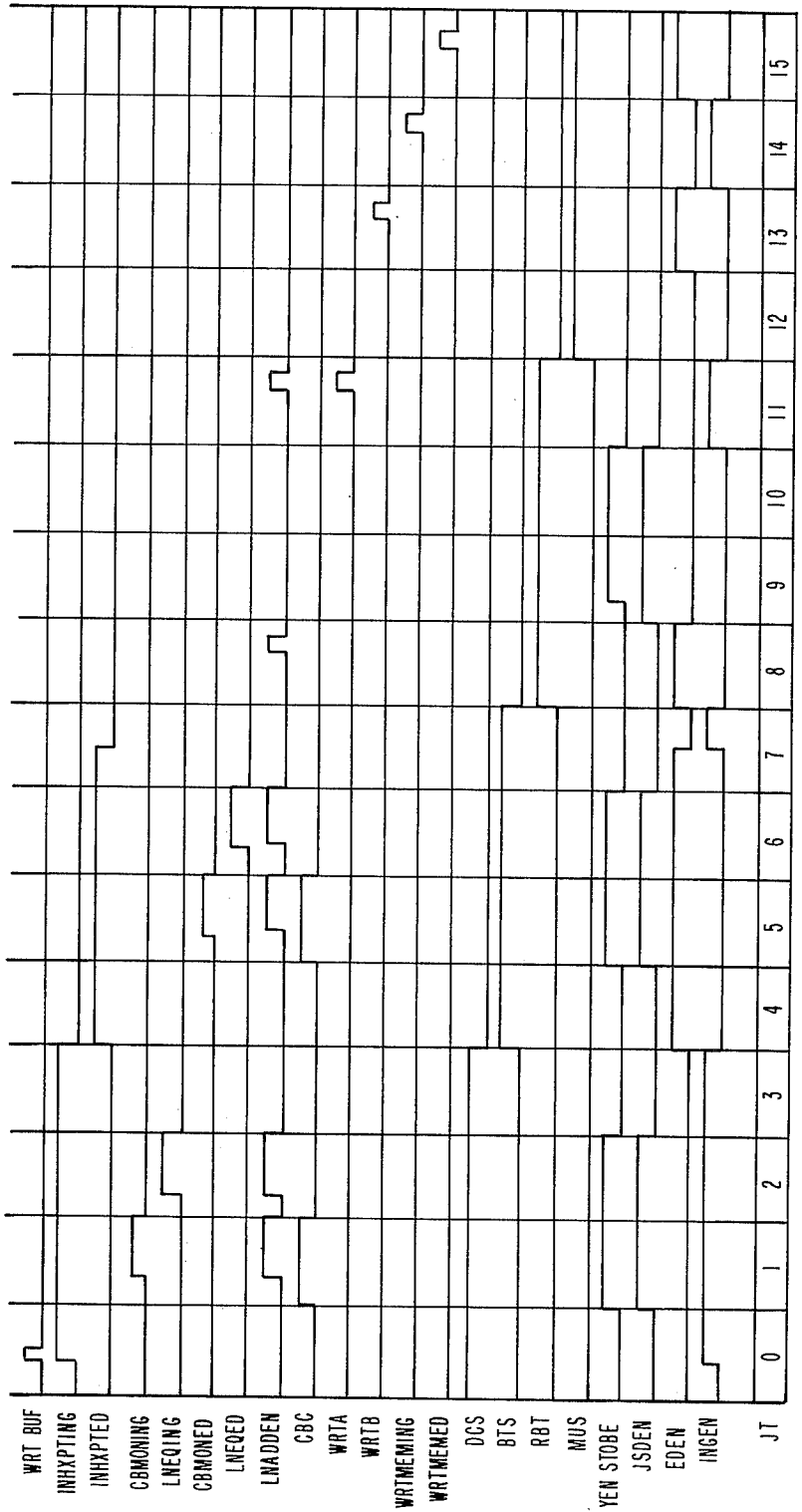

The system timing is controlled by the clock 115 in the common control 100 on the basis of various clock signals such as presented in FIGS. 2A through 2C. Typically, the clock 115 includes a 4 MHz crystal oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the embodiment disclosed, 32 junctors are connected to the output of the matrix 10, so that the junctor memory 140 will include 32 junctor time positions. In addition, the junctor memory 140 also includes time positions 32 and 33 which represent time periods during which a scanning of the lines is effected. Thus, after all junctors have been scanned, the line number designed by the line scanner 130 will be addressed during the time positions 32 and 33 to determine whether there is a request for service in connection with that line. At the end of each 32 time positions, the line scanner 130 will be advanced to the next line, with the result that the lines are scanned one at a time at the end of each complete scan of the junctors.

Each junctor time position is subdivided into junctor time slots during which the various functions required in connection with the call associated with the particular junctor are performed under control of the control circuit 110. During one or more of the time slots of each junctor time position, one or more functions may be performed by various elements of the common control as required by the state of the particular call which is under the control of the control circuits.

Figure 4:
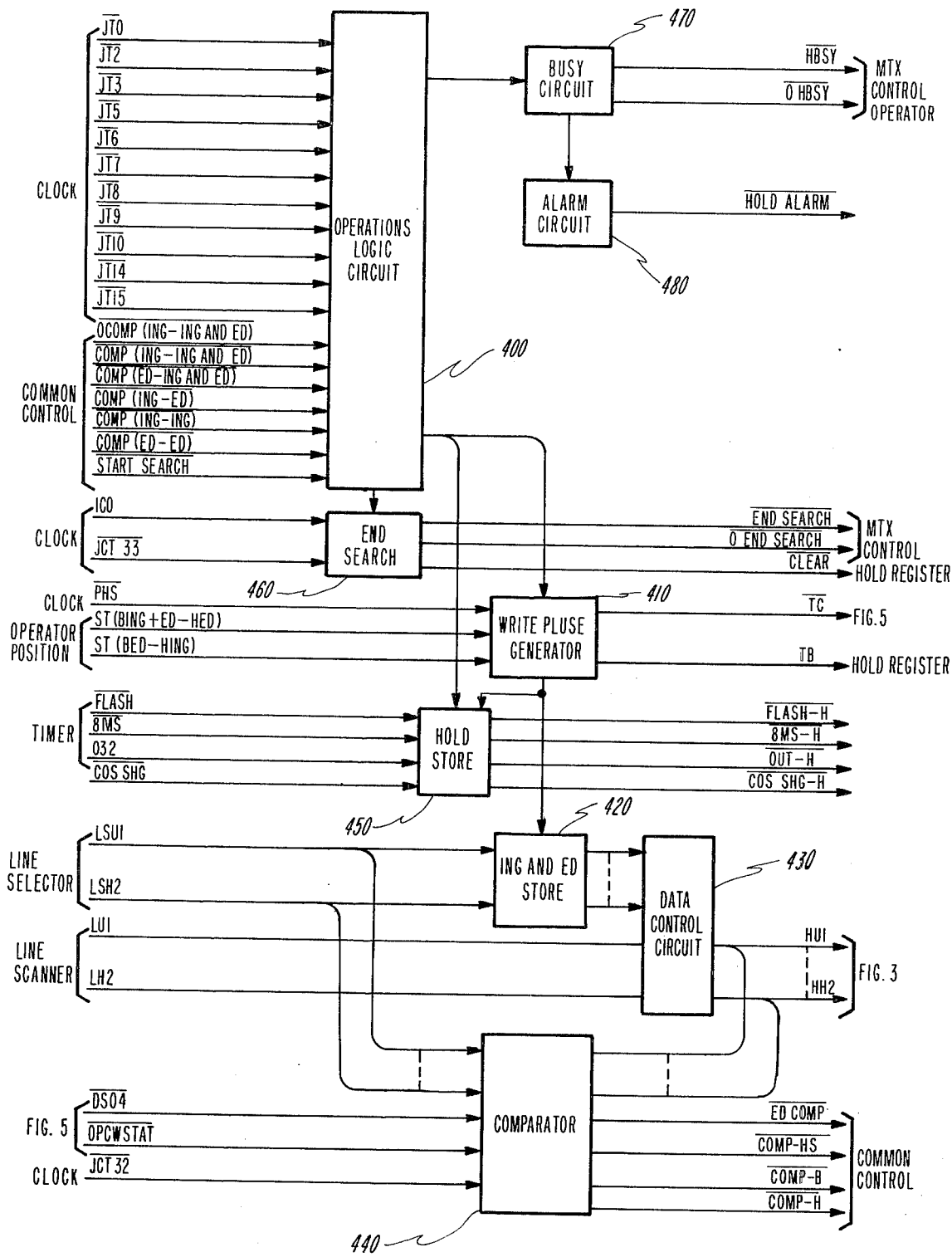
FIG. 4 is a schematic block diagram of a hold register shown in FIG. 1B.

FIG. 4A illustrates the output of a 4 MHz crystal oscillator (defining a portion of the clock 115) from which a plurality of phase signals PH1 through PH6 are derived by a clock phase generator producing a division by six of the basic frequency. The output of the clock phase generator is connected to a bit time slot counter which effects a division by 16 to produce the binary bit time slot signals BTS1 through BTS8. A decoding of the four bit binary time slot signals produces the 16 junctor time slot signals JT0 through JT15.

Further decoding of the binary bit time slot signals BTS1 through BTS8 also produces various timing signals which are utilized throughout the system. Those timing signals which will be utilized in the various common control circuits to be described below are illustrated in FIG. 4B in relation to the 16 junctor time slot signals JT0 through JT15. The function of these timing signals will be described in connection with the description of the detailed operation of the various common control elements.

FIG. 4C illustrates the waveforms which are derived from the junctor scanner portion of the clock 115. A further division by 34 produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and junctor 33 signals, JCT32 and JCT33.

THE STATUS CIRCUIT

Figure 5:
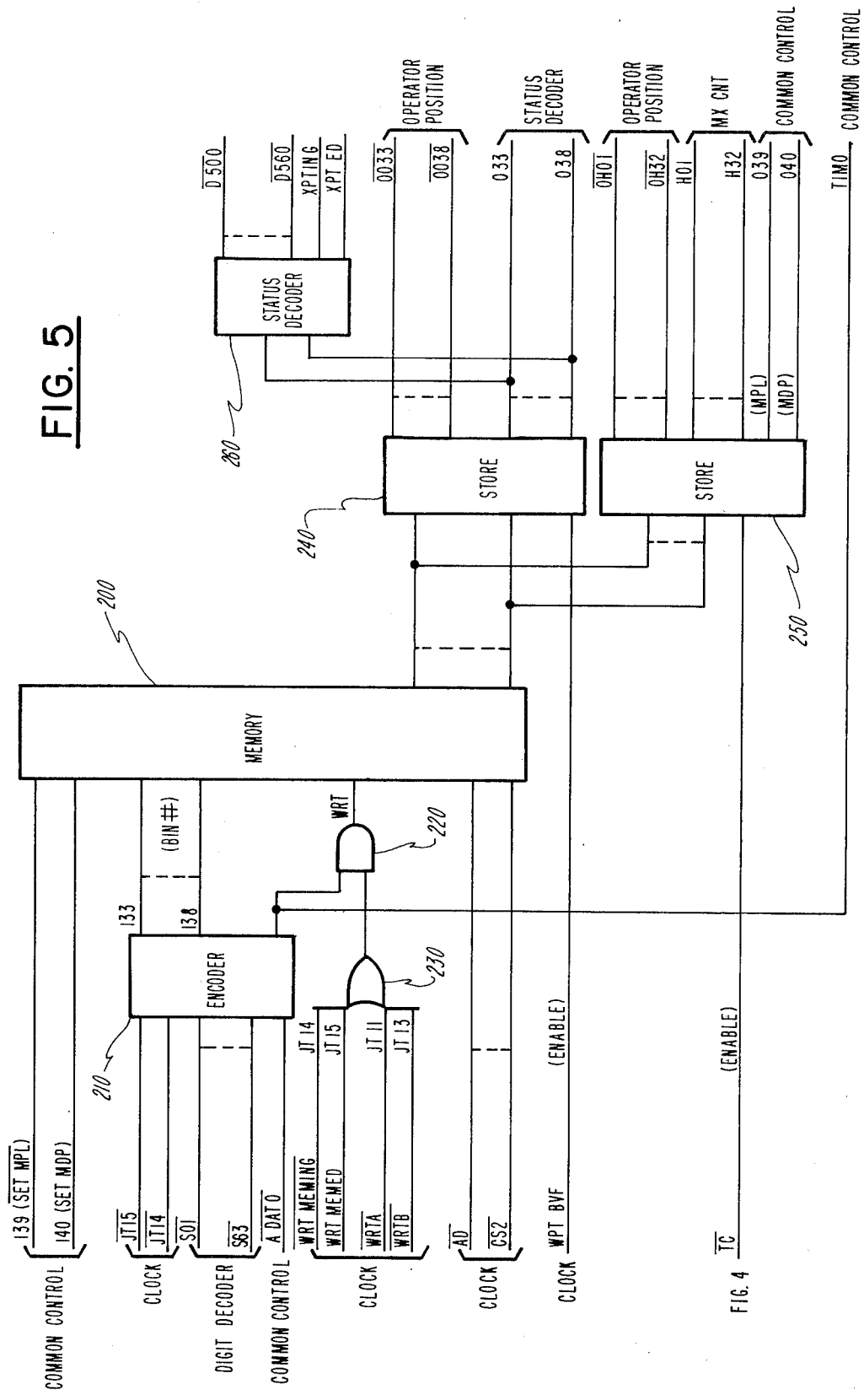
FIG. 5 is a schematic block diagram of the status circuit shown in FIG. 1B.

The status circuit 160 (see FIG. 5) basically forms a memory including a storage position for each of the junctors to store the state of the call associated with each of the junctors. As already indicated in the general system description, the common control 100 steps progressively through various states during which various operations are performed under control of the control circuits 110 to perform the functions required by the system. To determine what functions need to be performed during each junctor scan, the control circuits 110 determine from the status circuit 160 the state of the call associated with that junctor. As the functions associated with each state are completed, the control circuit 110 advance the status circuit 160 to the next state for the particular junctor involved so that the continuous record of the state of the call associated with each junctor is maintained within the status circuit.

In the status circuit, the memory 200 includes 34 junctor positions for the junctors JCT0 through JCT31 as well as the junctor times JCT32 and JCT33. The status of the call associated with each junctor is stored in the junctor times of the memory 200 in binary form, and therefore, an encoder 210 is provided to receive from the control circuits 110 the status signals S01 through S63 and provide the binary equivalents thereof on output lines 133 through 138 to the memory 200. Certain of the status signals SO1 through S63 are time shared at the input to the encoder 210 under control of the clock signals JT15 and JT14 from the clock 115. A further input to the encoder 210 from the control circuits 110 is the signal A DAT 0 indicating that all data is to be zeroed, i.e., the status stored in connection with a given junctor is to be 0, for example, when a call has been terminated. The status indications are applied from the encoder 210 to the memory 200 during various time slots by contolling the gate 220 from the output of gate 230. The clock signal WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals A0 through CS2 derived from the memory address generator controlled from the clock by the junctor signals JS1 through JS32.

In addition to the binary outputs I33 through I38 from the encoder, the memory 200 also receives direct codes of states I39 and I40 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 and 038 to the control circuits 110 and the matrix control 165. The signals 033 through 038 are also applied to a status decoder 260 which provides a binary-to-decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals 01101 through 01132 are applied to the operator complex, while the signals H01 through H32 are applied to the matrix control. The signal 038 and 040, which are direct codes of status, are applied to the control circuits 110.

A time zero signal TIM0 is derived from the encoder 210 to indicate to the timer each time a state changes in connection with a given junctor so that the timing functions performed by the timer may be reset to zero.

JUNCTOR MEMORY

The junctor memory 140 (see FIG. 3) includes an ING and ED write command logic circuit 300 which receives various command signals from the control circuit 110 along with junctor time slot signals from the clock and in turn controls the storage and read out of data into and out of a memory 320. The logic circuit 300 receives various command signals for storage of calling and called line numbers is designated locations of each junctor memory portion, which logic signals serve to control a data select circuit 310 receiving line numbers from the hold register 135 on binary inputs HU1 through HH2, from the line selector 155 on binary inputs LSU1 through LSH2, and from the digit decoder 150 on binary inputs DDU1 through DDH2. In accordance with the commands applied to the logic circuit 300, the line numbers from the hold register 135, line selector 155, and digit decoder 150 are gated to the memory 320 on leads 11 through 110 and stored in the memory 320 upon generation of the write command signal WRT from the logic circuit 300.

The commands received from the operator and the control circuits 110 relate to the storing of the called and calling numbers in the proper locations of each junctor portion of the memory. The command $\overline{\text{OING}}$ (H−ING) indicates that the calling number from the hold register 135 is to be stored in the ING number location of the junctor portion of the memory 320. Similarly, the command $\overline{\text{OING}}$ (H−ED) indicates that the called number from the hold register 135 is to be stored in the ING location associated with the attendant junctor. The command $\overline{\text{ING}}$ (O+ED) indicates placing the ED number from the operator in the ING register. The command ED (O+ED) indicates a request to place the ED number from the operator in the called portion of the memory. The command $\overline{\text{ING}}$ (LN+D1) indicates that the line number from the buffer is to be placed in the calling portion of the memory 320. The command $\overline{\text{ING}}$ (H−ED) indicates that the called number from the hold register 135 is to be placed in the calling portion of the memory 320. The command $\overline{\text{ED}}$ (DDT DCD) indicates that the number from the digit decoder 155 is to be placed in the called portion of the memory 320. The command $\overline{\text{ED}}$ (B−ING + ED) indicates that the calling and called line numbers from the buffer 330 are to be inserted in the called portion of the memory. The command $\overline{\text{ED}}$ (H−ING + ED) indicates a request that the calling and called numbers from the hold register 135 are to be placed in the called portion of the memory 140. The command $\overline{\text{ING}}$ (0) indicates that the number in the calling portion of the memory 140 is to be zeroed. The command $\overline{\text{ED}}$ (0) indicates that the number in the called portion of the memory 140 is to be zeroed. The command $\overline{\text{ADAT}}$ (0) indicates that all data is to be zeroed.

The signals from the clock 115 represent the various junctor time slots during which the various commands are to be executed. The clock also provides the binary signals A0 through A3, CS1 and CS2 which represent the memory addresses of the junctor portion corresponding to the junctor times JCT0 through JCT32. These junctor signals control the circulation of the data within the memory 320 so that in combination with the junctor time slots applied from the clock to the logic circuit 300, the data will be inserted into the proper junctor portion of the memory 320 during the proper time.

The output of the memory 320 is provided on leads $\overline{01}$ through $\overline{022}$ to a buffer store 330, which provides binary outputs 01 through 010 representing the calling number and binary outputs 013 through 022 representing the called number to the line selector 155. A further output ING PRES to the control circuits 110 indicates that the calling number is present and the output 0 RING PRES to the operator complex indicates that the calling number is present in the memory portion assigned to the attendant junctor.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

THE HOLD REGISTER

The hold register 135 (see FIG. 4) serves as a temporary memory for calling and called line numbers and other data generated within the common control 100 for use in controlling the functions required in establishing and maintaining a communication connection in the system. The hold register 135 also performs various comparison functions between line numbers, for example, in conjunction with busy searches, line scanning and other functions where a particular calling or called line number is to be compared with the calling and called line number stored in the junctor memory 140.

The functions of the hold register are initiated upon receipt of a comparison request signal or a start search signal from the operator or control circuits 110 in the common control 100. The comparison requests signals and the start search signal are applied to an operations logic circuit 400 along with junctor time slot signals JT0 through JT15 from the clock 115. The comparison request commands include the command $\overline{OCOMP}$ (ING–ING and ED) indicating a request for comparison of the ING number from the attendant's junctor with all ING and ED numbers stored in the junctor memory. The command $\overline{COMP}$ (ING–ING and ED) indicates a request for a comparison of an ING number with all ING and ED numbers of the junctors other than the attendant junctor 80. The command $\overline{COMP}$ (ED–ING and ED) indicates a request for comparison of a called number with all calling and called numbers stored in the junctor memory. The command $\overline{COMP}$ (ING–ED) indicates a request for comparison of a calling number to all called numbers. The command $\overline{COMP}$ (ING–ING) indicates a request for comparing a calling number to all calling numbers stored in the junctor memory. The command $\overline{COMP}$ (ED–ED) indicates a request to compare a called number with all called numbers stored in the junctor memory.

The various comparison requests are acted upon during various junctor time slots by the operations logic circuit and result in enabling of a write pulse generator 410, which in turn enables a hold store 450 and an ING and ED store 420. The hold store 450 receives various data relating to flashes, time-outs, whether the call is an income or outgoing call, a designation of the station hunting group, etc., for use by various elements of the common control 100 during the course of the following operations.

The ING and ED store 420 in the hold resister 135 stores the calling and/or the called line number associated with a particular junctor as received from the line selector on binary inputs LSU1 through LSH2. For example, if the hold register is requesting a comparison of a called number with all of the calling and called numbers stored in the junctor memory during the time junctor 10 is being scanned, the called number stored in the junctor memory position assigned to junctor 10 will be transferred from the line selector on leads LSU1 through LSH2 to the ING and ED store 420. The numbers stored in the ING and ED store 420 is then applied through the data control circuit 430 to one side of a comparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all of the calling and called numbers stored in the junctor memory is then effected by the comparator 440. Such a comparison, for example, would form part of the busy search where the system attempts to determine whether a called line is busy by scanning all of the junctor positions in the junctor memory to determine whether the line circuit has its number stored in connection with any other junctor. In this case, the status decoder forming part of the status circuit 160 would provide a signal $\overline{DS04}$ to the comparator 440 enabling the comparison of the numbers stored in the ING and ED store 420 with all numbers received from the line selector 155.

Other comparisons which are performed within the hold register relate to the scanning of the lines by the line scanner 130. At the end of each junctor 32 time position, the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scanner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides various outputs which may be required by the control circuits in the common control 100 for various functions. The output $\overline{ED-COMP}$ indicates that only a comparison of the called number has been detected. The outputs $\overline{COMP-HS}$ and $\overline{COMP-H}$ indicates a general comparison detected. The output $\overline{COMP-B}$ indicates that a comparison of a line with its own number has been detected.

The data control circuit 430 merely serves to multiplex the data which is to be applied to the comparator so as to avoid interference between comparisons associated with data stored in the ING and ED store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST (B ING-+ED—H ED) is a request to store the calling and called numbers from the buffer in the junctor memory in the called portion of the ING and ED store of the hold register. The signal ST (B ED—H ING) indicates a request to store the called number from the buffer in the junctor memory in the calling portion of the ING and ED store 420 of the hold register. Such transfers of information from one junctor to the other are necessary for various operations and require a holding of this information between junctor scan times so that the transfer from one junctor position to another junctor position in the junctor memory can be effected. This is accomplished in the ING and ED store 420 under control of the write pulse generator 410. The outputs TB and TC provide indications of the transfer operation and trunk consultation, respectively.

The hold register 135 also includes an end search circuit 460 connected to the operations logic circuit 400 and receiving the control signal IC0 and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{END\ SEARCH}$ and $\overline{O\ END\ SEARCH}$ are generated along with a $\overline{CLEAR}$ signal to effect control of various elements in the common control 100 at the end of the search.

The hold resister 135 also includes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{HBSY}$ and $\overline{O\ HBSY}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{HOLD\ ALARM}$ is generated from the alarm circuit 480.

TIE TRUNK CONTROL FLOW CHART

The system status diagram for the tie trunk control arrangement will now be more fully explained with reference to the status diagram of FIG. 6.

The junctors used in explaining the tie trunk sequences are indicated by blocks having a system status number corresponding to the state of the program to that point. The junctors are differentiated by a legend near the blocks indicating whether the junctor is a tie trunk junctor TT, or a trunk junctor TRK, or an attendant junctor ATT. Since the trunk asking for extension or the trunk extended to may be either a normal trunk or tie trunk, it should be realized that the legends, TT and TRK, are merely illustrative of a typical configuration and may be reversed. In a tie trunk to tie trunk extension, for example, both trunks are tie trunks TT.

The system may handle a plurality of different tie trunk connections and usually begins with the trunk call in progress status 13 (block B2) in a trunk or tie trunk junctor connected to an attendant. The attendant may be a local party that has operator class-of-service (COS OPS) called the "station attendant" or may be the turret attendant called the "attendant." The attendant depresses the start contact, STC, to begin the extension. The start contact produces a trunk holding status 14 in the tie trunk junctor TT (block B3) and an initial off-hook status 1 in the attendant junctor ATT (block B4). The attendant may dial via the attendant junctor either a trunk call or a local call during the dialing status 3 (block B6). If the call is a local call, the system continues as an attendant extended trunk to local station call which is a common feature of the system. Thus, the tie trunk is treated as any other trunk would be.

If the attendant has dialed a trunk, the system tests the busy-idle status of the trunk junctor TRK associated therewith and, if free, produces a trunk seizure status 12 for the trunk junctor TRK (block B8). If the operator, however, has dialed a restricted digit the busy tone status 11 is returned to the attendant junctor ATT (block B16) or, if the trunk is busy, the trunk busy status 38 (block B14). During the trunk junctor TRK seizure, the attendant junctor is freed by a free status O (block B12).

After the trunk seizure, the call progresses to the trunk call in progress status 13 (block B10) and the attendant is now connected to the called trunk (TRK). The attendant may release the trunk seized and return to the original trunk call in progress status 13 (block B2) by pressing the release destination contact RDC. The attendant may also perform a return progression by the RDC signal from either of blocks B6, B8, B14 or B16. The RDC operation causes the trunk junctor TT which is in the trunk hold status 14 to be returned to the trunk call in progress status 13 (block B2) with the attendant returning as the connected station.

If this action is taken, the local release of the attendant junctor status 15 (block B26) occurs and subsequently the attendant junctor is freed (block B28).

The trunk junctor TRK that was seized (block B8) and connected in a trunk call in progress status 13 (block B10) is released by a trunk release status 16 (block B30) and freed (block B32).

The tie trunk junctor having a trunk holding status 14 (block B3) may be released at any time during the preceding sequence in response to a trunk release signal TRK RLS from a tied PABX or a central office. The tie trunk junctor TT is progressed from a trunk release status 16 (block B24) to a free status O (block B22). These two conditions, blocks B24 and B22, also occur if during the trunk call in progress status 13 (block B2) the trunk releases, TRK RLS, or the operator presses the loop release contact, LRC.

With reference once again to the called trunk junctor TRK having a trunk call in progress status 13 (block B10), from block B10 the operator may form a three-way conference between the tie trunk party, the called trunk party, and the attendant by switching the exclude source key, EXSC, which places a tie trunk control status 54 in the tie trunk junctor TT (block B34) and the trunk junctor TRK (block D36). It should be recognized, however, that the trunk junctor may be a tie trunk junctor or that the tie trunk junctor may have been a trunk junctor to begin with.

If the attendant is the station attendant another path may be taken from the trunk call in progress status 13 (block B2) to the tie trunk control status 54. In this case, an attendant type function will be performed in which the tie trunk is extended to a PABX station or a trunk junctor by a hookflash. If the station having the OPS class-of-service operator, COS OPS, wishes to extend the tie trunk to a PABX station, the trunk transfer circuitry (block B18) which is more fully described in the above mentioned co-pending application, entitled, "Trunk Transfer" is utilized.

If, however, the station attendant wishes to extend the tie trunk to a trunk junctor, the trunk consultation circuitry (block B20), which is more fully described in the above mentioned copending application, entitled, "Trunk Consultation Arrangement" is utilized. A flash from the trunk consultation circuitry from block B21 produces the tie trunk control status 54 for the tie trunk and the trunk (in blocks B34 and B36, respectively).

The attendant now is able to form a tandem connection between the two tie trunks or between the tie trunk and the central office trunk. The attendant may operate the loop release contact, LRC, or if the attendant is a station attendant having the COS OPS class-of-service he may go on-hook. Either of these conditions transfers the tie trunk into a waiting status 10 (block B38) where the number of a dummy line is stored in the memory associated with the tie trunk junctor. The waiting status 10 (block B38) performs the operation of testing for busy dummy line numbers and advancing the stored dummy line number until a free dummy line is found. When a free dummy line is located, the system stores the number in the portion of the memory associated with junctor TT which is in tie trunk control status 54 and advances that junctor to a dummy line store status 61 (block B40). The comparison trunk junctor in the status 54 (block B36) is searched for and, when found, the number of the free dummy line is also stored in the memory associated with that trunk TRK. The two trunks are tandemed by the tie trunk connect status 32 (blocks B42 and B44, respectively). Therefore, the path connecting the tie trunk junctor TT and the trunk junctor TRK and providing the tandem operation is formed by the two crosspoints associated with the dummy line and the respective junctors.

If either of the two trunks releases from the tie trunk connection status 32 (block B42 and B44), the trunk junctor TRK is released by the trunk status 16 and freed by the free status O (blocks B46 and B48, respectively), and the tie trunk is released by the trunk release status 16 (block B50) and freed by the status O (block B52).

Alternative sequences are available for the system if either of the trunks has released prior to the tandem operation. During the trunk call in progress status 13 (block B10) and prior to the three-way connection (blocks B34 and B36), the tie trunk has already released, the trunk junctor TRK is placed in an attendant to outgoing trunk call status 29 (block B54) and the system continues with a trunk call with all common features available. If the system has progressed to a three-way conference (blocks B34 and B36) with the control status 54 stored therein, the tie trunk releases, a tie trunk call in progress status 13 is stored in the memory associated with the trunk junctor, permitting the attendant and the trunk caller to remain connected (block B56) and the tie trunk is released by a trunk release status 16 and freed by a free status O (blocks B50 and B52, respectively).

The situation is reversed if the trunk releases during the three-way conference in the tie trunk control status 54. The trunk is released by a trunk release status 16 and freed by a free status O (blocks B58 and B60) and the tie trunk caller is returned to a trunk call in progress status 13 (block B2) in which the attendant and the tie trunk caller are connected.

Figure 6:
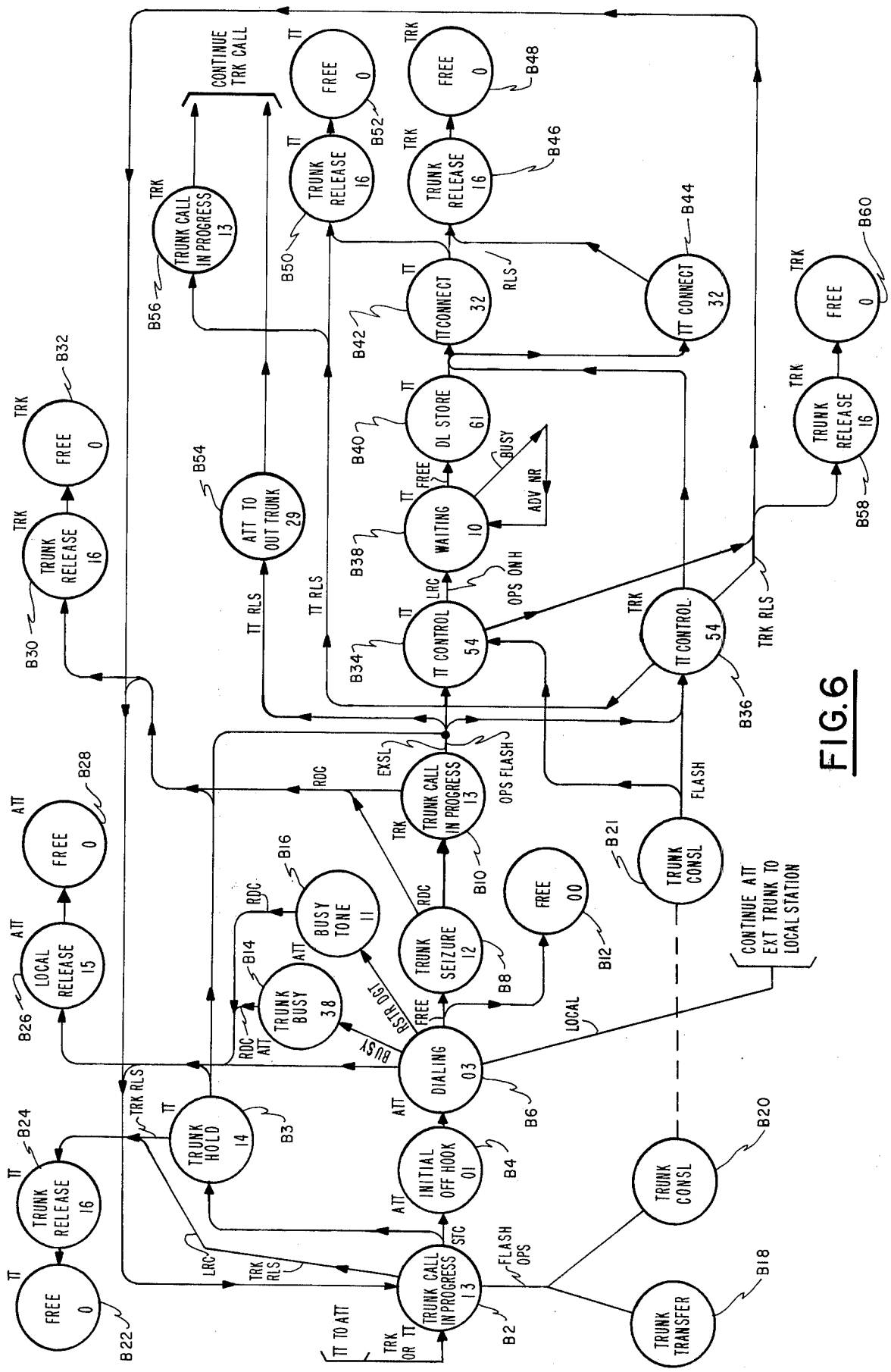
FIG. 6 is a status diagram illustrating the progression of the system through a tie trunk control operation.

The arrangement incorporates common circuitry of the PABX system to provide portions of the tie trunk control sequences shown in FIG. 6. Accordingly, the trunk release B22, B24, B30, B32, B46, B48, B50, B52, B58 and B60 and the local release B12, B26, B28 are provided as common features in the system. Also, the attendant extension of a trunk to a trunk or a station (B2–B16) is provided as a regular feature for trunks and consequently is used similarly in the tie trunk arrangement. The trunk transfer circuitry and the trunk consultation arrangement (B18, B20 and B21) are generally provided as special features of the above described system and are used in the tie trunk control arrangement by the station attendant.

Figure 7A:
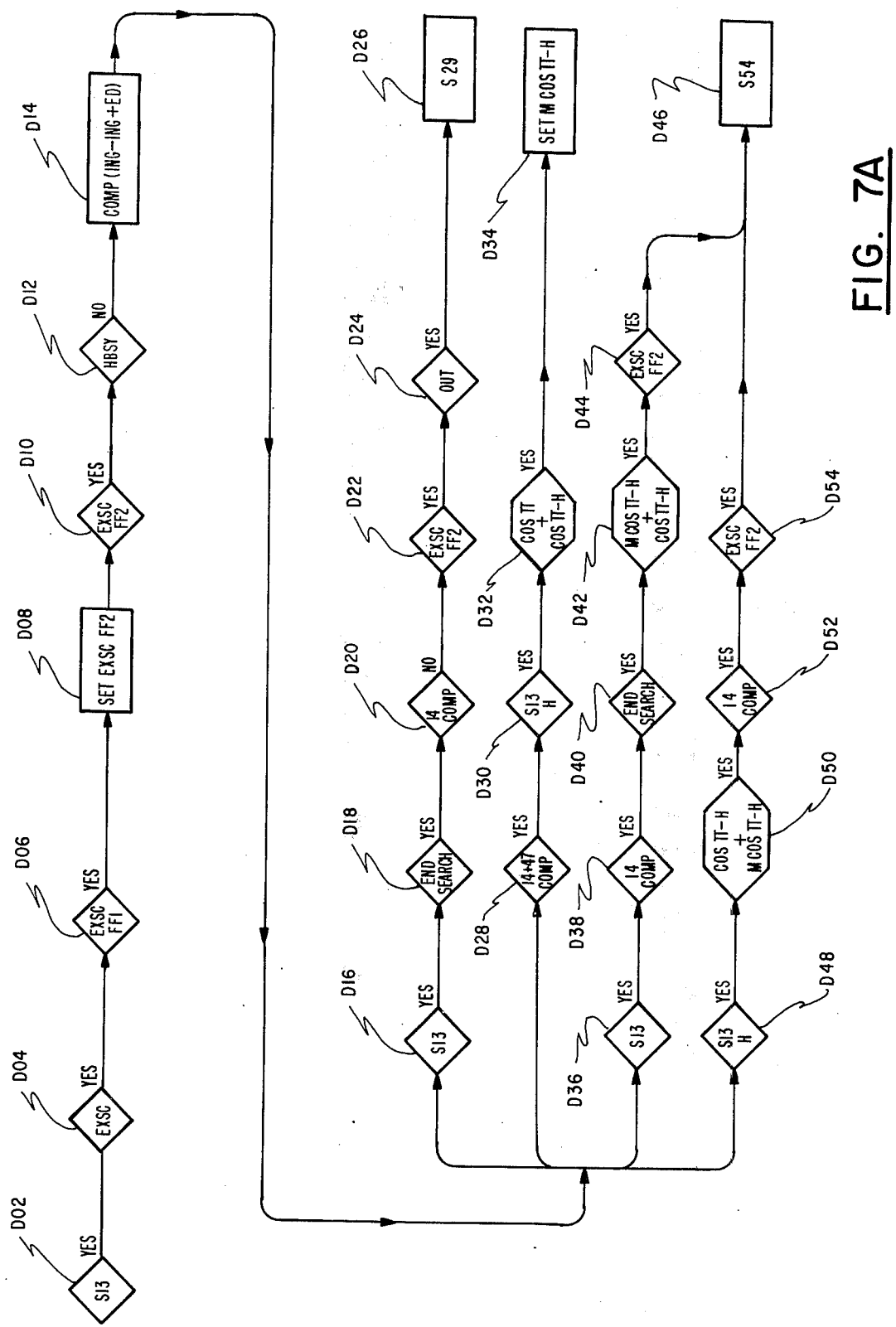

The tie trunk progression from a trunk call in progress status 13 to a tie trunk control status 54 or an attendant to outgoing trunk call status 29 will now be more fully explained with reference to FIG. 7A.

When the system is in a trunk call in progress status 13 with the operator in the ING portion of the trunk junctor (block D2) the attendant may depress the exclude source key EXSC (block D4). If the EX SC FF1 has been set previously (block D6), the exclude source flip-flop 2 EX SC FF2 is set at this time (block D8). The status 13 of the junctor presently being addressed and the exclude source flip-flop 2 set (D10) begins a hold register search if the hold register is not busy (block D12). The number searched for is the ING number (the attendant number) against all ING and ED numbers in memory (block D14). This progression allows the system to search for the held tie trunk containing the operator in the ED portion of the memory associated therewith.

During the comparison as the system addresses each junctor in turn, the tie trunk junctor which is in status 14 signal is located and the system produces a 14 COMP signal (block D28). The signal 14 COMP combined with the signal that the hold register search was initiated by a junctor containing status 13 S13-H (block D30) and that the junctor has the class-of-service tie trunk, COSTT, or the junctor which initiated the hold register search has the class-of-service tie trunk, COSTT-H, causes the storage of the class-of-service tie trunk bit, M COSTT-H (block D34). A 47 COMP signal (block D28) also initiates this path and is part of the trunk consultation circuitry used to place the tie trunks in a status 54 (tie trunk control) from the consultation operation.

The presence of the class-of-service tie trunk, COSTT, or the storage of the class-of-service tie trunk bit, the initiation of the hold register search, M COSTT-H, and the presence of a status 13 in the junctor memory associated with the junctor initiating the hold register search (blocks D48 and D50) progresses the system to a status 54 (block D46) upon transmission of the 14 COMP signal (block D52) and the setting of the exclude flip-flop EX SC FF2 (block D54). This initializes the tie trunk junctor to 54 and corresponds to block B34 in FIG. 7A.

The system then steps through the other junctors until it returns to addressing the trunk junctor that began the search containing the status 13 (block D36).

The presence of the 14 COMP signal (block D3) and an END SEARCH signal (block D40) are detected and the sequence continues to block D42. If the class-of-service tie trunk beginning the hold register search COSTT-H is positive or the MCOS TT-H bit has been set (block D42) and the exclude source flip-flop 2 EXSC FF2 is present (block D44), the system stores a status signal S54. These conditions, therefore, set the trunk junctor that began the search into a status 54 (block B36 in FIG. 6).

If, however, there is no 14 COMP signal found (block D20) after the END SEARCH signal is given (block D18) and the junctor which began the search is in status 13 (block D16), the exclude source flip-flop 2 EXSC FF2 is checked (block D22) and a check is made whether the call is an outgoing trunk call (yes - block D24). If so, the tie trunk has been released and the trunk junctor should be placed in a status 29 to allow the attendant to extend the outgoing trunk call to another station (block D26).

This flow chart is implemented by the logic shown in FIGS. 8A–C and will be more fully explained hereinafter with reference to those figures.

The logic which performs the functions shown (blocks D2 through D14) are common to the system for operator extended calls. The extension of the attendant to the outgoing trunk (block D26) and the path initiated to sequence from D16 through D24 are also common system circuitry of the arrangement.

In FIG. 8A, or OR gate 510 combines a signal 14 COMP with a signal 47 COMP and transmits an output signal to one input of an AND gate 530. One of the other inputs to the AND gate 530 is the status signal from the matrix control S13-H which indicates that the junctor originating the hold register search was in a status 13. The final input to the AND gate 530 is the output of an OR gate 512 which combines the class-of-service tie trunk signal, COS TT, and the indication (COS TT-H) that the junctor beginning the hold register search has a tie trunk class-of-service.

The output of the gate 530 is transmitted to the set input of the M COS TT-H flip-flop formed by an AND gate 536 and an OR gate 538. The storage of the M COS TT-H bit takes place in this flip-flop and is provided as a signal to the other control cards and tie trunk control circuitry. The reset input to the flip-flop at the AND gate 536 is the hold register signal not busy. The M COS TT-H bit is then set during an entire hold register search. The output of the flip-flop signal M COSTT-H is combined in an OR gate 546 with the signal COS TT-H to provide the set in the flip-flop formed of the AND gate 536 and the AND gate 538 and corresponds to the decisional block D34 in FIG. 7A.

The output of the OR gate 546 is combined with the 14 COMP signal (transmitted via an inverter gate 514) in an AND gate 550. The presence of both of these signals decoded by the AND gate 550 is transmitted to an AND gate 556 which is enabled by the status signal S13-H transmitted via an OR gate 532. This corresponds to decisional block flow D48–D50 and D52 of FIG. 7A. The output of the AND gate 556 is transmitted to an AND gate 560 which generates the status storage signal S54 via an AND gate 562 during the junctor time slot 14. The AND gate 560 is enabled by the signal O EX SCFF 2 from the operator circuit that the EXCLUDE source flip-flop 2 is set. The sequence corresponds to the decisional blocks D54 and D46 in FIG. 7A.

Another enabling input to gate the AND gate 556 transmitted via the OR gate 532 is a high signal from an AND gate 516. The AND gate 516 decodes the presence of the status signal DS13 from the status decoder and the END SEARCH signal from the hold register. The output of the AND gate 516 corresponds to the decisional blocks D36 and D40 and when combined with the output of the AND gate 550 via the AND gate 556 becomes the decisional block D42 in FIG. 7A. Upon the enablement of this path by the signal O EX SCFF 2, the AND gate 562 will transmit the status signal S54 for storage in the tie trunk junctor (D44 and D46 of FIG. 6).

The decisional sequence in which the system progresses from the status 54 to the status 10 for storing the dummy line number in the trunk junctor TT will now be fore fully explained with reference to FIG. 7B.

If the junctor presently addressed is in a status 54 (block D56), the junctor addressed has tie trunk class-of-service COS TT (block D58), and the block flip-flop is not set (block D60), the system interrogates whether the trunk call was incoming or outgoing (block D62). If the call was outgoing, (yes in block D62) the system checks to see whether the dummy line flip-flop is set (no in block D66), and whether the calling bridge relay for the ING number is set CB PING (block D68) and, if so, this condition has existed for two seconds (block D72). These conditions indicate that the calling number has gone on-hook and that a status 10 should be stored in the memory associated with the tie trunk junctor TT (block D76).

A further condition permitting this path to be followed is for the attendant to loop release ALO (block D70), which additionally stores the status 10 signal S10 (block D76). During this time the block flip-flop is set (block D74) and the system requests the first tie line dummy number (D76). When one dummy line number is found that is free it is transferred to the buffer memory and from there is transferred to the ED portion of the tie-trunk junctor, thereby replacing the attendant number or the station attendant number. Also associated with this command is an instruction to zero the ING portion of the memory ING O.

The block flip-flop set (D74) is to permit the system to initialize the tie trunk junctor only once in case the other junctor associated with the three-way conference is a tie trunk. The first time through the block flip-flop will be set and block the decisional path (D60) when the second tie trunk is found with a status 54 contained in the memory associated therewith (block D56).

If the trunk call was an incoming call (no in block D62) the path beginning with block D64 is chosen. If the dummy line flip-flop has not been set and the calling bridge relay of the ED number is also on-hook (block D78) for two seconds (block D82) the decisional sequence in block D76 will again be reached. The operator loop releasing, ALO, at this time (block D80) also transfers the system into the decisional sequence of block D76.

These decisional sequences are implemented in logic in FIGS. 8A through 8C and will be more fully explained hereinafter.

Figure 8B:
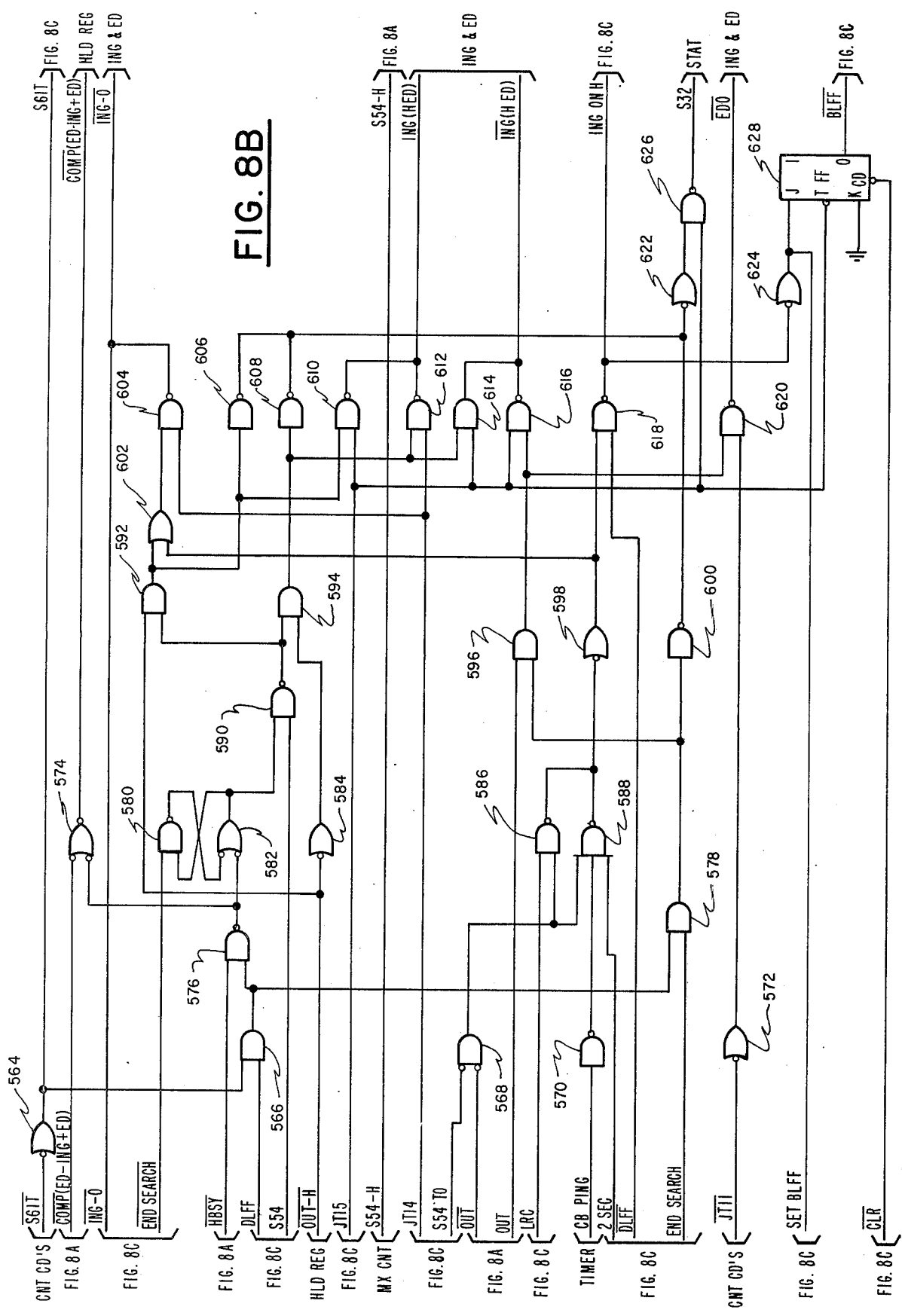
Figure 8C:
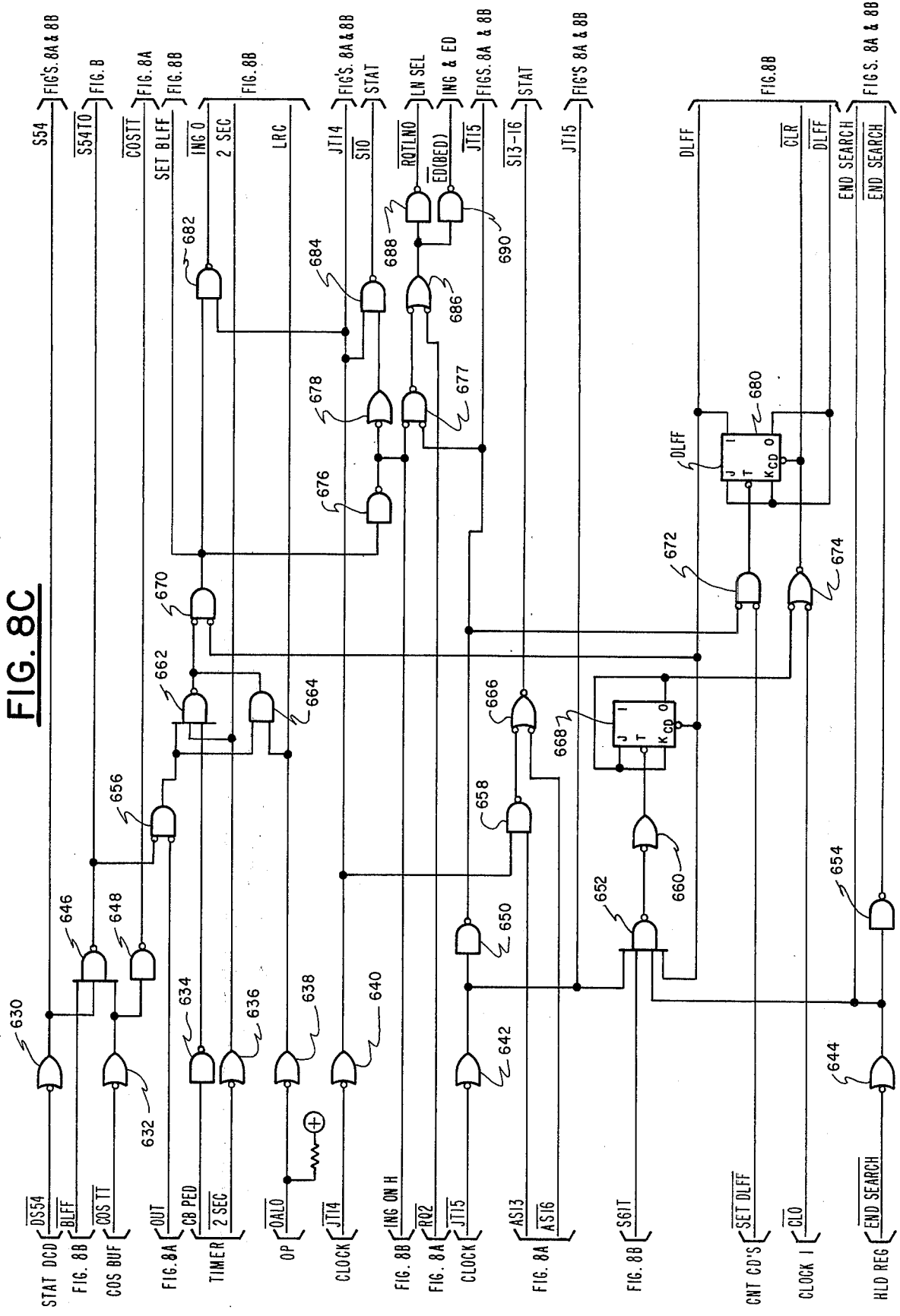

In FIG. 8C, an AND gate 646 decodes the coincidence of the signals BL FF (from FIG. 8B) indicating that the block flip-flop is not set, the signal DS54 from the status decoder indicating that the junctor has a status 54 stored in the memory associated therewith via an inverter 630, and the class-of-service tie trunk signal COS TT from the class-of-service buffer via an inverter gate 632.

The output of the gate 646 corresponds to the decisional block D60 in FIG. 7B, and is transmitted to an AND gate 656 which is enabled by the absence of a signal OUT indicating that the trunk call was incoming. The output of the AND gate 656 is transmitted to one input each of an AND gate 662 and an AND gate 664. Enabling inputs to the AND gate 662 are the absence of the CB PED indicating that the called party has gone on-hook via an inverter gate 634 and a two second signal, 2 SEC transmitted via an inverter gate 636. The enabling input for the AND gate 664 is the signal from the operator O ALO (transmitted via an inverter gate 638) indicating that the attendant has loop released. The outputs from the AND gate 664 and the AND gate 662 are tied together (ORed) to transmit an output to an AND gate 670. The AND gate 670 is enabled by the indication from JK flip-flop 680 that the dummy line has not been stored. The JK flip-flop 680 is the dummy line flip-flop and provides the signal DLFF to the tie trunk control circuitry.

The output of the gate 670 is used to issue the five commands found in the block D74 and D76 of FIG. 7B. The first command, set the block flip-flop, is given by a signal SET BLFF transmitted to FIG. 8B and to the J input of the block flip-flop. The output of the gate 670 also transmits the status signal S10 to the status circuit via an inverter gate 676, an inverter gate 618 and an AND gate 684 during junctor time slot 14. Further the request for the tie line number, RQTL NO, is transmitted via an OR gate 686, and an inverter gate 688 to the line selector by the AND gate 677 during the junctor time slot 15. The output of the OR gate 686 is used to enable an inverter gate 690 to produce the ING and ED storage signal ED (B ED) to store the ED number of the buffer into the ED portion of the memory associated with the junctor presently addressed. The fifth signal, the output signal from the AND gate 670 (transmitted via an AND gate 682) is the signal ING O which commands the system to clear the ING portion of the memory during the junctor time slot 14.

The path taken to check whether the calling number is on-hook is more fully explained by reference to the logic implementation shown in FIG. 8B wherein an AND gate 588 decodes the coincidence of a two second signal, 2SEC, an absence of the calling bridge relay for the ING number CB PING (transmitted via an inverter gate 570), and the presence of an out bit signal OUT (transmitted via the AND gate 568). The AND gate 568 is enabled by the signal S54TO which is the output of the AND gate 646 of FIG. 8C. The attendant loop release signal LRC (from FIG. 8C) is also transmitted through an AND gate 586 which is enabled by the output of the AND gate 568. The signals from the AND gate 586 and the AND gate 588 are combined and transmitted via an inverter gate 598 to one input of an AND gate 618. The other input to the AND gate 618 is the signal that the dummy line flip-flop is not set, DLFF, and when the AND gate 618 is enabled it transmits an output signal ING ON H to FIG. 8C. This signal produces the same five commands shown in blocks D74 and D76 in FIG. 7B.

The set the block flip-flop command is given by the output of the AND gate 618 (transmitted via an inverter gate 624) to the J input of the BLOCK flip-flop 628. The output of the AND gate 618 (signal ING ON H) is transmitted to FIG. 8C where it enables the AND gate 677 during junctor time slot 15 and is inverted becomes the RQTL NO signal and the signal ED (B ED) (via the inverter gate 690). The status 10 signal S10 is also produced by the ING ON H signal transmitted via the inverter gate 678 and the AND gate 684 during the junctor time slot 14. The last signal of the five produced (to clear the ING portion of the memory ING O) is given by the output signal from the gate 598 (in FIG. 8B), transmitted via an OR gate 602 to one input of an AND gate 604 which is enabled during the junctor time slot 14.

In FIG. 8A an AND gate 506 decodes the signal 04HT (from control cards) and the signals COS TTO from the class-of-service buffer. The output of the AND gate 506 enables an AND gate 526 to the output signal REQ2 to FIG. 8C during junctor time slot 15. The output of the AND gate 506 also produces the signal TLT 2 and 8 (via an inverter gate 528) and the signal TLT1 (via an inverter gate 544) to the line selector. These signals enable the system arrangement to perform the dummy line busy-idle test during status 10.

The decisional progression from the call waiting status 10 to the store the dummy line status 61 will now be more fully explained with reference to FIG. 7D. When the tie trunk junctor is found in a status 10 (block D152), the system asks if the junctor has a tie trunk class-of-service, COSTT. The dummy line flip-flop is set and the junctor status changed to S61 upon a positive indication of the presence of both of these conditions.

The signals to the tie trunk control arrangement indicating this sequence are the signal S61T (FIG. 8B) and the signal set DLFF (FIG. 8C).

The decisional progression from the store dummy line status 61 to the tandem operation of the tie trunks in the status 32 will now be more fully explained with reference to FIG. 7E.

When the tie trunk junctor TT has progressed to the status 61 (block B122) the system interrogates whether the trunk has trunk class-of-service and, if so, progresses the system to block B126 in which the DL flip-flop is checked. If the DL flip-flop is set, the hold register is interrogated to determine if it is busy (block D128).

When the hold register is not busy, a comparison search of all the ING and ED numbers with the ED number of the junctor presently addressed is started by the command COMP (ED ING+ED) if the DL flip-flop was set at the time the hold register search was begun (block D134) and the junctor has a status 54, the system now checks for the presence of an out bit in the memory associated with the junctor that began the hold register search (block D146). If present, the arrangement will zero the ING portion of memory, stores the hold register number into the ED portion of the memory associated with the junctor having the status 54, and replaces the status by S32 (block D148). This action writes the dummy line number of the hold register into the trunk junctor containing the status 54 and allows the tandem operation of the trunks. If the call was an incoming call (no in block D146), the reverse is done and the called portion of the hold register is placed in the ING portion of the memory associated with the trunk junctor and the ED portion cleared by a signal ED (H ING) (block B150). The status 32 is also placed in the junctor at that time.

After the junctors are all addressed and the search has ended (yes in block D132). If the dummy flip-flop is still set (block D138), the dummy line flip-flop is cleared, the block flip-flop is cleared (block D140) and a status 32 placed in the memory associated with the trunk junctor at that time. If the call is an outgoing call (block D142) the ED number in the hold register is placed into the ING portion of memory associated with the tie trunk junctor and the ED portion cleared (block D144). The decisional blocks of FIG. 7E are implemented by the logic circuitry shown in FIGS. 8A–C and more fully described hereinafter.

In FIG. 8B, an AND gate 566 combines the presence of the status 61 signal, S61 T (transmitted via an inverter gate 564) with the dummy line flip-flop set signal, DLFF. The coincidence of a high output from the AND gate 566 and the hold register not busy signal HBSY is decoded by an AND gate 576 which transmits the comparison signal COMP (ED—ING+ED) via an OR gate 574 to the hold register. The output signal from the AND gate 576 also resets the flip-flop formed by an AND gate 580 and an OR gate 582. The flip-flop remains set for an entire hold register search. The comparison signal causes a comparison of the ED number with all ING and ED numbers in the junctor memory and corresponds to the decisional block D130 in FIG. 7E.

One input to an AND gate 590 is the output of the reset flip-flop formed of the AND gate 580 and the OR gate 582 and the other input thereto is the status signal S54. The coincidence of these two signals permits enabling of an AND gate 592 and of an AND gate 594. This corresponds to the decisional block D136 of FIG. 7E. The AND gate 592 is enabled by the absence of the signal OUT-H indicating that the out bit was not set when the hold register search was begun. The output of the gate 592 therefore transmits the clear the ING portion of memory signal, ING O, via an OR gate 602 and an AND gate 604 which is enabled during the junctor time slot 14. Additionally, the output of the AND gate 592 (transmitted via an inverter gate 606, an inverter gate 622 and an AND gate 626) produces the store the status signal S32 during the junctor time slot 15. Finally the output of the AND gate 592 (transmitted via an AND gate 610) produces the store ED portion of the hold register into the ED portion of the junctor memory signal ED (H ED) during the junctor time slot 15.

Therefore the output of the AND gate 592 corresponds to the decisional block D148 in FIG. 7E. If the signal OUT H is present (via an inverter gate 584), the AND gate 594 is enabled. The output of the AND gate 594 (transmitted via the AND gate 626, the inverter gate 608, the inverter gate 622, and the AND gate 626) produces the store the status signal S32 to the status memory circuit during the junctor time slot 15.

Additionally, the output of the AND gate 594 (transmitted via an AND gate 612) produces the store the hold register number into the ED portion of the junctor memory signal (ED H ED) during junctor time slot 14 (transmitted via an AND gate 614) and the store the ED portion of the hold register into the ING portion of the junctor memory ING (H ED) during the junctor time slot 15. These signals correspond to the decisional block D150 to FIG. 7E.

When the END SEARCH signal appears, the flip-flop formed by the gates 580 and 582 is reset by the signal END SEARCH. At the same time an AND gate 578 is enabled by the output of the AND gate 566. The output of the AND gate 578 (transmitted via the inverter gate 600, the inverter gate 622, and the AND gate 626) is used to store the status signal S32 during the junctor time slot 15. The output of the AND gate 678 is also transmitted to an AND gate 596 whose other input is enabled by the presence of the out bit signal OUT. The coincidence of these signals provide an output to an AND gate 616 which produces the signal ING (H ED) during the junctor time slot 15. The output of the gate 596 (transmitted via an AND gate 620) is also used to generate the signal to clear the ED portion of the junctor memory signal ED O during junctor time slot 11.

Additionally (FIG. 8C), an AND gate 652 decodes the coincidence of the S61 T signal with the presence of the END SEARCH signal (transmitted via an inverter gate 644) and the presence of the DL flip-flops being set, to produce a toggle of the JK flip-flop 668 during the junctor time slot 15. The JK flip-flop 668 is configured such that it produces a resetting pulse to the dummy line flip-flop via an OR gate 674 and a clearing pulse to the block flip-flop in FIG. 8B via a signal CLR. The dummy line flip-flop and the block flip-flop may also be cleared by the clock signal CLO (transmitted via the OR gate 674) which is a master reset signal in the system. These signals correspond to the blocks D140 and D144 in FIG. 7E.

The release of the tie trunks and their progressions to either status 16 or status 13 from the status 54 conference or status 32 tandem operation will now be more fully explained with reference to the decisional flow chart, FIG. 7C.

When the central office releases one of the trunks used in a tandem tie trunk operation or a three-way trunk conference block D84 and CB PT relay goes low (block D86) and the system recognizes the trunk junctor has class-of-service trunk operation (block D88). This produces a signal trunk on-hook (block B90). If the addressed trunk junctor is in either a status 32 or status 54, a hold register search is initiated by interrogating if the hold register is busy (block D94) and whether the call is an incoming or outgoing trunk call (block D96). An indication that the call is incoming produces a search of the ING and ED memory for a comparison with the ED number stored (block D100), and an indication that the call is outgoing produces a comparison of the ING and ED numbers against the ING number stored therein.

When the search makes a comparison (yes in block D108) and if the junctor that initiated the hold register search was in status 54 stored therein (block D116), the system then checks the junctor presently addressed for a status 54 in the memory associated therewith. If the status 54 is present, a status 13 is stored in the memory of the trunk junctor that the system is presently addressing. This corresponds to a trunk release and reconnects the tie trunk with the attendant status 13 trunk call in progress. The system then ends the search, producing a positive indication in block D104, and when the trunk on-hook signal is detected (block D102), the junctor which began the hold register search is freed by the S16 indication. If, on the other hand, the comparison finds that the hold register search was begun with the status 32 junctor, the junctor presently addressed is interrogated for the presence of a status 32 signal (block D112). If the indication is affirmative, the junctor is released by a status 16. The second path D102, D104 and D106 (when the system ends the search) is found and releases the second junctor containing the status 32. Therefore, when one junctor releases from the tandem operation, both junctors are released. In the tie trunk conference mode status 54, on the other hand, a release by one trunk will produce a status 13 in the other junctor not releasing, and release status 16 in the release junctor.

The decisional blocks of FIG. 7C are implemented in the logic circuitry shown in FIGS. 8A–8C and will now be more fully explained.

In FIG. 8A, an OR gate 518 decodes the presence of either the status signal S32 (transmitted via an inverter gate 500) from the status decoder or the status signal DS54 transmitted via an inverter gate 630 (in FIG. 8C). The output of the OR gate 518 is used to enable an AND gate 532 and an AND gate 540. The AND gate 540 is used to decode the coincidence of an output signal from the OR gate 518, and the trunk on-hook signal TRK ON H and the hold register signal the not busy signal $\overline{HBSY}$. The output signal from the gate 540 then begins the hold register search by giving the comparison commands to compare either the ING or ED number against all ING and ED numbers in memory.

The comparison command for the ING number is produced via an AND gate 552 and inverter gate 558 that is enabled by the presence of an out bit signal OUT transmitted via an inverter gate 504. The ED comparison signal is generated by an AND gate 554 that is enabled by the absence of the output signal OUT (transmitted via an inverter gate 524 and the inverter gate 504) from the timer. These signals correspond to the decisional blocks D98 and D100 of FIG. 7C.

An AND gate 532 decodes the coincidence of the trunk on-hook signal TRK ON H and the output of the OR gate 518 and transmits the signal to an AND gate 542 which is enabled by the signal END SEARCH. The output of the gate 542 (transmitted via an AND gate 544) becomes the status signal AS16 during the junctor time slot 15. The status signal AS16 is transmitted to FIG. 8C and becomes (via an OR gate 666) the status signal S16 to the status circuit. This signal corresponds to the block D106 of FIG. 7C.

An AND gate 520 decodes the coincidence of the status signal from the matrix control S32-H, the COMP H signal from the hold register (transmitted via an inverter gate 502), and the status signal DS32. The output of the gate 520 is transmitted then to the AND gate 544 which is enabled during the junctor time slot 15 and transmits the AS16 signal to FIG. 8C where it becomes the status signal S16. The signal S16 corresponds to the decisional block D114 of FIG. 7C.

An AND gate 522 decodes the coincidence of the status 54-H signal, the S54 signal, and the COMP-H signal (transmitted via an inverter 502) and, when enabled, transmits an output signal that becomes (via an inverter gate 546) the status signal AS13. The status signal AS13 is transmitted to FIG. 8C where it becomes (via the OR gate 666 and an AND gate 658 during junctor time slot 14) the status signal S13.

While a preferred embodiment of the present invention has been illustrated, it will be apparent to those skilled in the art to which the invention pertains that various changes and modifications may be made therein without departing from the spirit and scope of the appended claims.

What is claimed is:

1. In a private automatic branch exchange having a solid state switching matrix for effecting connections between local calling stations and local called stations, between local stations and incoming and outgoing trunk parties and between at least one attendant position and local stations and trunk parties, having a common control for effecting the connections via individual ones of a plurality of local, incoming, outgoing and tie trunk junctors and at least one attendant junctor, having a memory for the local junctors, incoming, outgoing and tie trunk junctors and attendant junctors, and having first call extending circuit means for automatically extending an incoming tie trunk call via the attendant junctor to the attendant position, a tie trunk control arrangement comprising:
    first holding circuit means responsive to a first signal from the attendant position for placing the incoming tie trunk call in a holding status;
    second call extending circuit means responsive to a second signal from the attendant position for connecting the attendant position via a trunk junctor to a trunk;
    first connecting a circuit means responsive to a third signal from the attendant position for connecting the incoming tie trunk to the trunk.

2. A tie trunk control arrangement as claimed in claim 1 further comprising:
    releasing circuit means responsive to a third signal from the attendant position for releasing the attendant position from the established connection between the incoming tie trunk and the outgoing trunk.

3. A tie trunk control arrangement as claimed in claim 1 wherein the trunk junctor to which the attendant is connected is a tie trunk junctor and the trunk to which the incoming tie trunk is connected is a tie trunk.

4. A tie trunk control arrangement as claimed in claim 1 wherein at least one of the local stations has an operator class-of-service and the first call extending circuit means is further arranged to extend the incoming tie trunk call via a local junctor to the one local station, and the tie trunk control arrangement further comprises:
    second connecting circuit means being responsive to a signal from the one local station for connecting the incoming tie trunk to a second tie trunk via a free tie trunk junctor.

5. A tie trunk control arrangement as claimed in claim 1 wherein the second call extending circuit means comprises:
- first status progression circuit means responsive to the second signal from the attendant position for progressing the incoming and outgoing trunk junctors from the holding status to a tie trunk control status;
- second status progression means responsive to the third signal from the attendant position for progressing the status of the incoming trunk junctor to a call waiting status;
- first storage means responsive to the progression of the incoming trunk junctor to the call waiting status for storing the number of a free dummy line into the memory associated with the incoming trunk junctor;
- third status progression circuit means responsive to the storage of the number of the dummy line for progressing the incoming trunk junctor to a dummy line store status;
- second storage means responsive to the progression of the incoming trunk junctor for storing the number of the free dummy line in the memory associated with the outgoing trunk junctor, and
- second connecting circuit means responsive to the storage of the number of the dummy line in both the memory associated with the incoming trunk junctor and the memory associated with the outgoing trunk junctor for connecting the incoming trunk via the incoming trunk junctor, the dummy line and the outgoing trunk junctor to the outgoing trunk.

6. A tie trunk control arrangement as claimed in claim 5 wherein the first storage means includes:
- attempt circuit means arranged to store successive dummy line numbers in the memory associated with the incoming trunk junctor, and
- testing circuit means responsive to the storage of a dummy line number in the memory for testing the busy-free condition of the dummy line and responsive to finding a busy condition for actuating the attempt circuit means to store the next dummy line number in the memory until a free dummy line number is found.

* * * * *